US012667785B2

(12) United States Patent
Wang et al.

(10) Patent No.: US 12,667,785 B2
(45) Date of Patent: Jun. 30, 2026

(54) VIRTUAL OBJECT CONTROL METHOD BASED ON DISTANCE FROM PLAYER-CONTROLLED VIRTUAL OBJECT

(71) Applicant: Tencent Technology (Shenzhen) Company Limited, Shenzhen (CN)

(72) Inventors: Yachang Wang, Shenzhen (CN); Yang Yang, Shenzhen (CN); Yulong Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 248 days.

(21) Appl. No.: 18/204,017

(22) Filed: May 31, 2023

(65) Prior Publication Data

US 2023/0302362 A1    Sep. 28, 2023

Related U.S. Application Data

(63) Continuation of application No. PCT/CN2022/130217, filed on Nov. 7, 2022.

(30) Foreign Application Priority Data

Jan. 27, 2022    (CN) .......................... 202210101350.1

(51) Int. Cl.
*A63F 13/56*        (2014.01)
*A63F 13/52*        (2014.01)

(52) U.S. Cl.
CPC .............. *A63F 13/56* (2014.09); *A63F 13/52* (2014.09)

(58) Field of Classification Search
CPC ................................. A63F 13/56; A63F 13/52
See application file for complete search history.

(56) References Cited

U.S. PATENT DOCUMENTS 6,966,837 B1 * 11/2005 Best ........................ A63F 13/52
463/32
8,062,110 B2 * 11/2011 Shimizu .................. A63F 13/42
463/2

(Continued)

FOREIGN PATENT DOCUMENTS

CN          114404987 A        4/2022

OTHER PUBLICATIONS

International Search Report and Written Opinion received for PCT Patent Application No. PCT/CN2022/130217 with English Translation, mailed on Jan. 28, 2023, 9 pages.

(Continued)

*Primary Examiner* — Malina D. Blaise
(74) *Attorney, Agent, or Firm* — ArentFox Schiff LLP

(57)        ABSTRACT

A virtual object control method includes controlling a first virtual object in a virtual environment through a first behavior tree, the first virtual object being a Non-Player character (NPC) in the virtual environment, and obtaining a first distance between the first virtual object and a second virtual object controlled by a player in the virtual environment, the second virtual object being a closest virtual object controlled by a player to the first virtual object. The method further includes selecting, based on the first distance, a behavior tree among plural behavior trees for controlling the first virtual object. The first distance inversely relates to an amount of computing resources consumed during use of the selected behavior tree.

20 Claims, 10 Drawing Sheets

(56) References Cited

U.S. PATENT DOCUMENTS

| | | | | |
|---|---|---|---|---|
| 10,402,731 | B1 * | 9/2019 | Cosic | G06N 5/022 |
| 11,278,795 | B2 * | 3/2022 | Taura | A63F 13/428 |
| 11,344,809 | B2 * | 5/2022 | Kando | G06F 3/04842 |
| 11,890,541 | B2 * | 2/2024 | Hu | A63F 13/426 |
| 12,186,661 | B2 * | 1/2025 | Li | A63F 13/537 |
| 2006/0252531 | A1 * | 11/2006 | Kando | A63F 13/335 |
| | | | | 463/36 |
| 2006/0252540 | A1 * | 11/2006 | Kando | A63F 13/10 |
| | | | | 463/36 |
| 2007/0260567 | A1 * | 11/2007 | Funge | A63F 13/67 |
| | | | | 706/47 |
| 2010/0312995 | A1 * | 12/2010 | Sung | G06N 3/006 |
| | | | | 715/757 |
| 2011/0304630 | A1 * | 12/2011 | McNeely | G06T 13/20 |
| | | | | 345/473 |
| 2011/0304638 | A1 * | 12/2011 | Johnston | G06T 11/40 |
| | | | | 345/582 |
| 2014/0066200 | A1 * | 3/2014 | Matsui | A63F 13/2145 |
| | | | | 463/31 |
| 2017/0206797 | A1 * | 7/2017 | Solomon | G06N 3/006 |
| 2017/0225076 | A1 * | 8/2017 | Kharkar | A63F 13/56 |
| 2017/0354885 | A1 * | 12/2017 | Kitazono | A63F 13/47 |
| 2018/0264364 | A1 * | 9/2018 | Zou | A63F 13/822 |
| 2018/0308473 | A1 * | 10/2018 | Scholar | A63F 13/00 |
| 2018/0353859 | A1 * | 12/2018 | Asakura | A63F 13/60 |
| 2019/0043239 | A1 * | 2/2019 | Goel | G06T 13/205 |
| 2019/0164007 | A1 * | 5/2019 | Liu | G06V 20/54 |
| 2019/0184286 | A1 * | 6/2019 | Du | A63F 13/67 |
| 2019/0197402 | A1 * | 6/2019 | Kovács | G06N 3/08 |
| 2019/0205727 | A1 * | 7/2019 | Lin | G06Q 40/04 |
| 2019/0295306 | A1 * | 9/2019 | Weston | A63F 13/56 |
| 2020/0122038 | A1 * | 4/2020 | Ebrahimi | G06N 3/045 |
| 2020/0122040 | A1 * | 4/2020 | Juliani, Jr. | G06N 3/091 |
| 2020/0145615 | A1 * | 5/2020 | Seko | G10L 17/26 |
| 2020/0197811 | A1 * | 6/2020 | Eatedali | A63F 13/67 |
| 2020/0368622 | A1 * | 11/2020 | Kando | G06F 1/1669 |
| 2020/0372400 | A1 * | 11/2020 | Carreira-Perpiñán | |
| | | | | G06F 16/9027 |
| 2020/0401576 | A1 * | 12/2020 | Yerli | G06T 7/70 |
| 2022/0309364 | A1 * | 9/2022 | Perry | A63F 13/56 |
| 2023/0271087 | A1 * | 8/2023 | Hu | A63F 13/56 |
| | | | | 463/31 |
| 2023/0310995 | A1 * | 10/2023 | Saeedi | A63F 13/67 |
| | | | | 463/43 |
| 2023/0381647 | A1 * | 11/2023 | Mizukami | A63F 13/52 |
| 2024/0082731 | A1 * | 3/2024 | Sato | A63F 13/822 |
| 2024/0218367 | A1 * | 7/2024 | Anderson | C07K 14/005 |
| 2024/0399249 | A1 * | 12/2024 | Xiong | A63F 13/69 |

OTHER PUBLICATIONS

Office Action and Search Report received for Chinese Patent Application No. 202210101350.1, mailed on Jun. 28, 2025, 19 pages (9 pages of English Translation and 10 pages of Original Document).

Office Action and Search Report received for Chinese Patent Application No. 202210101350.1, mailed on Jun. 28, 2025, 30 pages (20 pages of English Translation and 19 pages of Original Document).

"Research on Intelligent Game Character Control Based on Evolutionary Behavior Trees", Ge Shiqiang, China's Outstanding Master's Thesis Full-text Database, Information Technology Edition, vol. 2019, Issue 03, Mar. 2019, 9 pages of Original Document.

* cited by examiner

220

Control a first virtual object through a first behavior tree

↓

240

Obtain a first distance between the first virtual object and a second virtual object in a virtual environment, as well as a second distance between the first virtual object and a third virtual object in the virtual environment

↓

260

Determine, on the basis of the first distance in a case that the first distance is less than the second distance, that the first virtual object is controlled through a second behavior tree

FIG. 2

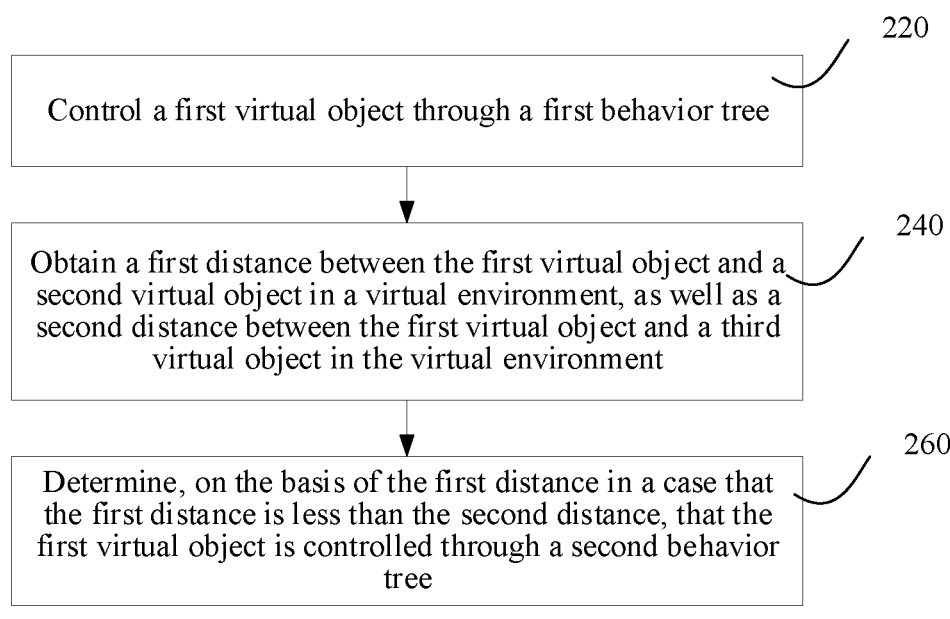

VIRTUAL OBJECT CONTROL METHOD BASED ON DISTANCE FROM PLAYER-CONTROLLED VIRTUAL OBJECT

RELATED APPLICATIONS

This application is a continuation of International Application No. PCT/CN2022/130217, filed on Nov. 7, 2022, which claims priority to Chinese patent application No. 202210101350.1, filed on Jan. 27, 2022, and entitled "VIRTUAL OBJECT CONTROL METHOD AND APPARATUS, DEVICE, MEDIUM, AND PROGRAM PRODUCT." The disclosures of the prior applications are hereby incorporated by reference in their entirety.

FIELD OF THE TECHNOLOGY

Embodiments of this application belong to the field of computer technologies, including a virtual object control method and apparatus, a device, a medium, and a program product.

BACKGROUND OF THE DISCLOSURE

There are a large number of Artificial Intelligence (AI) objects in open world games, which are Non-Player Characters (NPCs) with anthropomorphic behaviors.

In related technologies, a large number of AI objects often use the same behavior tree. However, if an AI object can achieve a rich representation form, the behavior tree used by the AI object is inevitably very complex. If a large number of AI objects use the same complex behavior tree, the performance of a server is inevitably severely tested.

How to avoid a large number of AI objects from consuming excessive server resources while ensuring that the AI objects can achieve a rich representation form has become an urgent technical problem to be solved.

SUMMARY

This disclosure provides a virtual object control method and apparatus, a device, a medium, and a program product, which are used to ensure that an NPC can also achieve rich representations in a case of limited computer device resources. The technical solutions are as follows.

In an embodiment, a virtual object control method includes controlling a first virtual object in a virtual environment through a first behavior tree, the first virtual object being a Non-Player character (NPC) in the virtual environment, and obtaining a first distance between the first virtual object and a second virtual object controlled by a player in the virtual environment, the second virtual object being a closest virtual object controlled by a player to the first virtual object. The method further includes selecting, based on the first distance, a behavior tree among plural behavior trees for controlling the first virtual object. The first distance inversely relates to an amount of computing resources consumed during use of the selected behavior tree.

In an embodiment, a virtual object display method includes displaying a first virtual object and a second virtual object in a virtual environment, the first virtual object being a Non-Player character (NPC), the second virtual object being a virtual object controlled by a player. The method further includes displaying, when a first distance between the first virtual object and the second virtual object in the virtual environment is p, the first virtual object performing a first quantity of actions. The method further includes displaying, when the first distance is q, the first virtual object performing a second quantity of actions. When p is greater than q, the first quantity is less than the second quantity and when p is less than q, the first quantity is greater than the second quantity.

In an embodiment, a virtual object control apparatus includes processing circuitry configured to control a first virtual object in a virtual environment through a first behavior tree, the first virtual object being a Non-Player character (NPC) in the virtual environment. The processing circuitry is further configured to obtain a first distance between the first virtual object and a second virtual object controlled by a player in the virtual environment, the second virtual object being a closest virtual object controlled by a player to the first virtual object. The processing circuitry is further configured to select, based on the first distance, a behavior tree among plural behavior trees for controlling the first virtual object. The first distance inversely relates to an amount of computing resources consumed during use of the selected behavior tree.

In an embodiment, a non-transitory computer-readable storage medium stores computer-readable instructions which, when executed by a computer device, cause the computer device to perform a virtual object control method includes controlling a first virtual object in a virtual environment through a first behavior tree, the first virtual object being a Non-Player character (NPC) in the virtual environment, and obtaining a first distance between the first virtual object and a second virtual object controlled by a player in the virtual environment, the second virtual object being a closest virtual object controlled by a player to the first virtual object. The method further includes selecting, based on the first distance, a behavior tree among plural behavior trees for controlling the first virtual object. The first distance inversely relates to an amount of computing resources consumed during use of the selected behavior tree.

In an embodiment, a non-transitory computer-readable storage medium stores computer-readable instructions which, when executed by a computer device, cause the computer device to perform a virtual object display method includes displaying a first virtual object and a second virtual object in a virtual environment, the first virtual object being a Non-Player character (NPC), the second virtual object being a virtual object controlled by a player. The method further includes displaying, when a first distance between the first virtual object and the second virtual object in the virtual environment is p, the first virtual object performing a first quantity of actions. The method further includes displaying, when the first distance is q, the first virtual object performing a second quantity of actions. When p is greater than q, the first quantity is less than the second quantity and when p is less than q, the first quantity is greater than the second quantity.

The behavior tree for controlling the first virtual object is determined on the basis of the first distance between the first virtual object and the second virtual object, so that the behavior tree for controlling the first virtual object is always in a dynamically adjusted state. That is, NPCs closer to and farther from the second virtual object will be controlled through different behavior trees. The behavior tree used by the closer NPC consumes a large number of resources, and the behavior tree used by the farther NPC consumes a small number of resources. Total computer device resources consumed by a large number of NPCs will be maintained in a balance state, so that the computer device resources will not be excessively consumed, thereby reducing a running load of the computer device. Meanwhile, when an NPC is close to the second virtual object, the NPC has a rich representation form.

In addition, in a case that there are multiple player objects (namely, virtual objects controlled by players), target distances to behavior trees for controlling an NPC is determined by comparing distances between the NPC and the player objects, so that the behavior trees of the NPCs are more reasonable, thereby improving the representation reasonability of the NPC.

BRIEF DESCRIPTION OF THE DRAWINGS

FIG. 2 shows a flowchart of a virtual object control method provided according to one exemplary embodiment of this disclosure.

FIG. 3 shows a schematic diagram of a level of distance (LOD) layering technology provided according to one exemplary embodiment of this disclosure.

DESCRIPTION OF EMBODIMENTS

Figure 1:
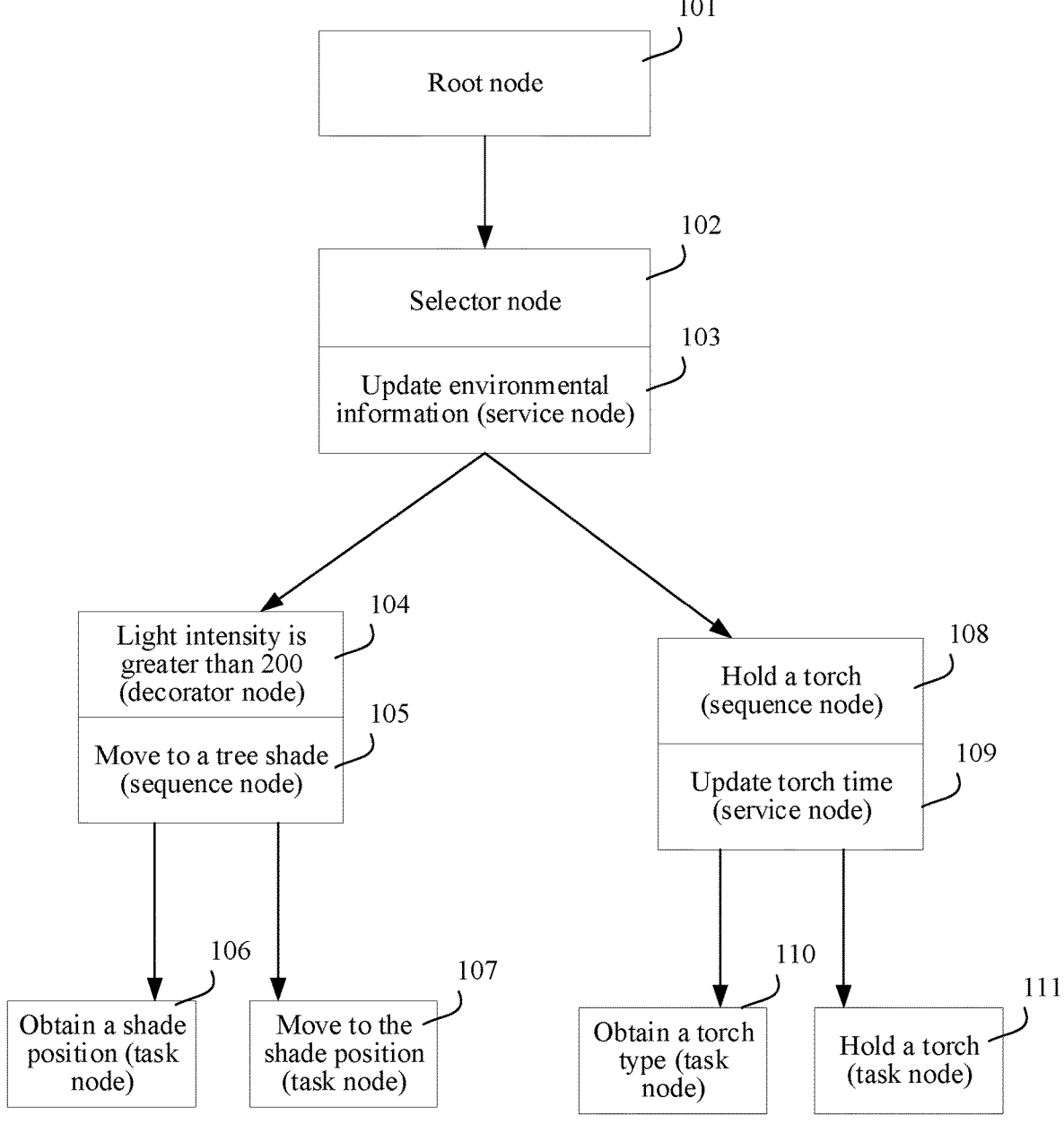
FIG. 1 shows a schematic diagram of a behavior tree provided according to one exemplary embodiment of this disclosure.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with this disclosure. On the contrary, the implementations are merely examples of apparatuses and methods that are described in detail in the appended claims and that are consistent with some aspects of this disclosure.

It is understood that "several" mentioned herein means tone or more, and "plurality" means two or more. "And/or" describes an association relation for associated objects and represents that three relationships may exist. For example, A and/or B may represent: only A exists, both A and B exist, and only B exists. The character "/" usually indicates an "or" relation between associated objects.

The related technology of this disclosure is first introduced:

In the relevant technology of this disclosure, an AI object representation control scheme includes controlling an AI object through a finite state machine or a Behaviac behavior tree (a kind of behavior tree).

The finite state machine is a traditional AI technology implementation scheme that defines various states of an AI object and conditions of switching between the states. When the AI object is in state A, if condition C of switching from state A to a state B is satisfied, the AI object can be switched from state A to the state B. The AI object performs different tasks in different states, and a switching state is determined through the conditions. A complete AI object representation is formed by combining a series of states and switching conditions. The advantage of the finite state machine is that its principle and implementation are relatively simple, but its defect is also obvious. The finite state machine is usually applicable to situations with limited states and simple transfer relationships. AI object representation in a big world game is relatively complex. To divide states, there are many states, and transfer relationships between different states are complex. The AI objects controlled by the finite state machine have an extremely low abstraction level and are not intuitive enough.

The Behaviac behavior tree is an open source behavior tree implementation scheme, which implements control nodes such as selector, sequence, SimpleParallel, and condition, so as to facilitate switching of behavior tree execution nodes. In a running process of the behavior tree, AI object representations can be transformed by switching different execution nodes. The advantage of the Behaviac behavior tree is that a service side only implements simple execution and condition nodes, which can decouple a service logic from a behavior tree control logic, making it suitable for a more complex AI object representation. However, the Behaviac behavior tree does not support a blackboard function, so debugging is not intuitive, and the parallel node is not convenient to use.

In the relevant technology of this disclosure, an AI object representation synchronization scheme includes server operation and distribution, client operation+server forwarding, and client operation+synchronization to server.

In order to ensure the consistency and real-time performance of AI object representations during forming a team of multiple players, a relevant solution is to place control of AI objects on a server, that is, the server is responsible for operation of an AI object related logic, and distributes an operation result to various clients for representation (namely, server operation and distribution). For game works in which an AI object is desired to represent rich behaviors, in order to reduce a load on the server to control AI object representations, a related solution is to transfer a behavior tree operation logic that controls an AI object to a client, and the client performs a behavior tree node logic operation, and then reports an AI object operation result to the server. Finally, the server forwards the result to another client (namely, client operation+server forwarding). Another related solution is independent operation by each client, using certain technical means to ensure the consistency of operation structures (namely, client operation+synchronization to server).

The advantages of the server operation and distribution include accurate logic, small delay, and no client cheating. However, the defects of the server operation and distribution are also relatively obvious. In open world games, placing a large number of server AI operations on the server may significantly affect the performance and is not conducive to player experience. Therefore, in this scheme, an AI object has a relatively single representation, such as simple patrol, pursue, and escape.

The advantage of the client operation and server forwarding is that the operational load on the server can be greatly reduced, and the server performance is improved. However, this scheme inevitably leads to a problem that it is easy for a client to cheat. Furthermore, when the client responsible for operation has a poor network state, this will affect the AI object representations of other clients. At the same time, this scheme has certain limitations and is more applied to products with short single games.

The scheme of the client operation+synchronization to server also has some obvious defects. For example, operations of many clients are easily inconsistent, which leads to different representations of the same AI object in different clients, and poses a security risk. In addition, it is hard for this scheme to support richer AI object representations, such as combination with a time system and a weather system.

This embodiment of this disclosure dynamically determines, on the basis of a distance an AI object and a virtual object controlled by a player, a behavior tree used for controlling the AI object. A behavior tree used by a closer AI object consumes a large number of resources, and a behavior tree used by a farther AI object consumes a small number of resources, thereby ensuring that the closer AI object has a rich representation form, reducing loss of computer device resources required for controlling a large number of AI objects, and reducing a running load of a computer device. The technical solutions of the embodiments of this disclosure are described in detail below.

Terms involved in the embodiments of this disclosure will be briefly introduced below:

Virtual environment: It is a virtual environment displayed (or provided) by a client when the client is run on a terminal (also referred to as a terminal device). The virtual environment can be a simulated environment of a real world, a semi-simulated and semi-fictional environment, or a purely fictional environment. The virtual environment is any one of a two-dimensional virtual environment, a 2.5-dimensional virtual environment or a three-dimensional virtual environment, and this disclosure does not limit this. The following embodiments illustrate a virtual environment as a three-dimensional virtual environment.

The virtual environment can provide a battle environment for virtual objects. For example, in an open world game, players can freely control virtual objects to roam in the virtual environment and choose a time point and way to complete game tasks. During the roaming, the virtual objects controlled by the players will continuously interact with an AI object in the virtual environment. For example, in Escape games, at least one virtual object engages in a single game battle in a virtual environment. Each virtual object survives in the virtual environment by escaping attacks launched by an enemy and dangers existing in the virtual environment (such as gas circles and swamps). If hit points of a virtual object in the virtual environment decrease to zero, the life of the virtual object in the virtual environment ends. A virtual object that eventually passes through routes at game levels is a winner. For example, in Pass games, at least one virtual object engages in a single game battle in a virtual environment. Each virtual object obtains a clearance permission for a current level by killing monsters, in order to enter a next level or end the current game battle.

Virtual object: It refers to a movable object in the virtual environment. The movable object may a virtual person, a virtual animal, an animation character, and the like. For example: a person and an animal in a three-dimensional virtual environment. In an embodiment, the virtual object is a three-dimensional model established on the basis of an animation skeleton technique. Each virtual object has its own shape and volume in the three-dimensional virtual environment occupying part of a space in the three-dimensional virtual environment.

Unreal Engine (UE) 4: Unreal engine 4 is a development engine for applications that can include games and the like. Unreal engine 4 can be referred to as UE4.

UE4 behavior tree: It refers to a behavior tree provided in UE4. The UE4 behavior tree includes a root node, a composites node, a task node, an auxiliary node, and the like.

The root node is a start node of the UE4 behavior tree.

The composites node includes a sequence node, a selector node, and a SimpleParallel node. There are at least two child nodes suspended under the composites node.

The sequence node is used for indicating sequential execution of subordinate nodes. If all the subordinate nodes return a success, the sequence node itself returns a success. If any subordinate node returns a failure, the execution of the subsequent subordinate nodes will be stopped. If there is no task node below a sequence node, a failure is returned to the sequence node.

The selector node is used for indicating sequential execution of subordinate nodes. If one of the subordinate nodes return a success, the selector node itself returns a success. If all the nodes return a failure, the sequence node returns a failure. If there is no task node below a selector node, a failure is returned to the selector node.

The SimpleParallel node is used for connecting one main task node with another SimpleParallel node, and the another SimpleParallel node includes a composites node or a task node. If the main task node returns a success, the SimpleParallel node returns a success. If the main task node returns a failure, the SimpleParallel node returns a failure, and a result of the SimpleParallel node is independent of a return result of another SimpleParallel node.

The task node is used for controlling an AI object to perform specific behaviors. The task node is often located at the bottommost portion of the UE4 behavior tree and is a destination of the behaviors of the AI object. The task node can be simply divided into a task node of instantaneous completion (referred to as an instantaneous task node) and a task node lasting for a period of time (referred to as a lasting task node). If a lasting task node has an interrupt, the lasting task node is interrupted through a decorator node in the UE4 behavior tree.

The auxiliary node includes a decorator node and service node.

The decorator node is used for being attached to the composites node or task node. The decorator node is used for determining whether to execute a subtree of the UE4 behavior tree and whether to interrupt the subtree.

When a superior node of the decorator node is a selector node, the decorator node has four setting options: None, Self, LowerPriority, and Both. When a superior node of the decorator node is a sequence node, the decorator node has two setting options: None and Self.

None: A decorator node that selects None only executes a condition determination function. If a calculation result is true, a branch where the decorator node is located will be executed. If a calculation result is false, the branch where the decorator node is located will not be executed.

Self: A decorator node that selects Self not only executes the condition determination function, but also interrupts the branch where the decorator node is located. If a condition determination result changes from true to false when the branch where the decorator node is located is executed, the execution of the branch is interrupted.

LowerPriority: A decorator node that selects LowerPriority not only executes the condition determination function, but also interrupts a low-priority branch. If a condition determination result changes from false to true when a low-priority branch is executed, the low-priority branch is interrupted, and the branch where the decorator node is located is executed instead.

Both: A decorator node that selects Both not only executes the condition determination function, but also interrupts the branch where the decorator node is located or the low-priority branch.

The service node is usually attached to a composites or task node, as long as its branch is executed, and the service node will be executed at a defined time interval. The service node is often used for checking and updating a blackboard. The service node replaces a traditional Parallel node in other behavior tree systems. The service node will not have any return value, and will not directly affect an execution flow of the UE4 behavior tree.

A blackboard is used for storing data used by executing the UE4 behavior tree. The data used by executing the UE4 behavior tree is referred to as a blackboard value. The blackboard is used for cooperating with the UE4 behavior tree to control representations of AI objects.

An implementation environment of the embodiments of this disclosure will be introduced below.

In the embodiments of this disclosure, a behavior tree that controls representations of a first virtual object is run in a server or a terminal. FIG. 1 shows a schematic diagram of a behavior tree provided according to one exemplary embodiment of this disclosure. Composites nodes include a selector node 102, a sequence node 105, and a sequence node 108, and the behavior tree also includes a root node 101.

A task node 106, a task node 107, a task node 110, and a task node 111 are task nodes that control the representations of the first virtual object. A service node 103 is attached to the selector node 102. The service node 103 is used for updating environmental information every preset cycle during execution of a branch under it and storing updated environmental information on a blackboard. The environmental information may include light intensity of a current environment. A service node 109 is attached to a sequence node 108. The service node 109 is used for updating a torch duration every preset cycle and storing an updated torch duration on the blackboard. The torch duration is from time when the first virtual object (such as an AI object and an NPC) starts to execute a task branch of holding a torque to current time.

A decorator node 104 is used for determining to execute a task branch of moving to a tree shade (or not to execute a task branch of moving to a tree shade), or determining to interrupt execution of a task branch of moving to a tree shade (or to interrupt the execution of the task branch of holding a torch).

In an embodiment, when the light intensity exceeds 200, the decorator node 104 determines to execute the task branch of moving to a tree shade. When the light intensity does not exceed 200, the decorator node 104 determines to execute a low-priority branch. Specifically, how the decorator node 104 controls branch execution and interruption needs to be determined on the basis of attribute settings of the decorator node, which will not be introduced in detail here.

In one embodiment, the behavior tree shown in FIG. 1 is all run in a server. The server includes at least one of one server, multiple servers, a cloud computing platform, and a virtualization center. For example, the server includes a processor and a memory. The memory includes a receiving module, a control module, and a transmission module. The receiving module is configured to receive a request transmitted by an application, such as a request that a player controls a second virtual character to move. The control module is configured to control rendering of a virtual environment. The transmission module is configured to transmit a response to the application, such as transmitting, to the application, an instruction of controlling the second virtual character to move.

In one embodiment, the behavior tree shown in FIG. 1 is all run in a terminal. Applications that support a virtual environment are installed and run on the terminal. Device types of terminals of applications that support a virtual environment are the same or different, and the device types include: at least one of a smart television, a wearable device, a vehicle-mounted terminal, a smartphone, a tablet computer, an e-book reader, a Moving Picture Experts Group Audio Layer 3 (MP3) player, an MP4 player, a laptop computer, and a desktop computer.

In one embodiment, the behavior tree shown in FIG. 1 is partially stored and run in a server and partially stored and run in a terminal. This embodiment of this disclosure does not limit this.

In one embodiment, before the behavior tree that controls the representations of the first virtual object is run, this disclosure also uses a LOD layering technology to determine a level of the first virtual object. This layering process can be partially stored and run in a server, and partially stored and run in a terminal. This layering process can also be all stored and run in the server. This layering process can also be all stored and run in the terminal. This embodiment of this disclosure does not limit this.

In the following embodiments, running the behavior tree and the LOD layering technology all in the server is exemplified.

To ensure that an NPC can achieve a rich representation form even under a condition of limited computer device resources, FIG. 2 shows a flowchart of a virtual object control method provided in an exemplary embodiment of this disclosure. The method is exemplified by running in a server. The method may include:

Step 220: Control a first virtual object through a first behavior tree. For example, a first virtual object is controlled in a virtual environment through a first behavior tree, the first virtual object being a Non-Player character (NPC) in the virtual environment.

The first virtual object refers to an NPC with anthropomorphic behaviors. In an open world game, the first virtual object can also be referred to as an AI object. The AI object does activities in a virtual environment through its own control logic. In an embodiment, the activities include self-interaction. For example, the AI object patrols in its territory, argues with an AI object that invades the territory, takes a rest, sleeps, and the like. In an embodiment, the activities also include interacting with a virtual object controlled by a player. For example, the AI object is curious about a virtual object controlled by a player and constantly observes the virtual object; the AI object is nervous in face of the virtual object controlled by the player and escapes away fast; and the like.

First behavior tree: It refers to a behavior tree used for controlling the representations of the first virtual object. In an embodiment, the first behavior tree is a UE4 behavior tree. In one embodiment, the UE4 behavior tree is obtained by peeling off a behavior tree module from UE4, and culling out engine-related portions.

In one embodiment, the first behavior tree may be a behavior tree used for controlling the first virtual object in a case that there is no virtual object controlled by a player within a preset range of the first virtual object. The first behavior tree may also be a behavior tree used for controlling the first virtual object when all players cannot observe the first virtual object. For example, when all players cannot observe the first virtual object, the first behavior tree is used for controlling a representation of the first virtual object as standing still in situ. The first behavior tree may also be referred to as an initial behavior tree. For example, the first behavior tree may refer to a behavior tree in a default initial state when the client starts to be run. For another example, the first behavior tree may refer to a behavior tree of the first virtual object before current time, and the behavior tree of the first virtual object at the current time needs to be updated. That is, the current time is time when the behavior tree of the first virtual object needs to be updated. This embodiment of this disclosure does not limit this.

In one embodiment, the first behavior tree may be a behavior tree used for controlling the first virtual object when the first virtual object has already been within an observation range of a player. For example, referring to FIG. 1, when the first virtual object has been already within an observation range of a player, the decorator node 104 corresponding to the first behavior tree is used for determining whether to execute the branch of moving to a tree shade (or not to execute the branch of moving to a tree shade), and whether to interrupt the execution of the branch of moving to a tree shade (or the lower-priority branch, namely, the branch of holding a torch).

In one embodiment, the server manages the first virtual object through a spatial octree. Octree is a tree-form data structure. Each internal node has exactly eight child nodes and is often used for dividing a three-dimensional space into eight quadrants recursively. When the first virtual object is managed through the spatial octree, each octree node records a space size and information of the first virtual object contained.

Step 240: Obtain a first distance between the first virtual object and a second virtual object in a virtual environment, as well as a second distance between the first virtual object and a third virtual object in the virtual environment. For example, a first distance is obtained between the first virtual object and a second virtual object controlled by a player in the virtual environment, the second virtual object being a closest virtual object controlled by a player to the first virtual object.

The second virtual object refers to a virtual object controlled by a player, and the third virtual object refers to a virtual object controlled by another player. The another player is a player other than the player. The virtual environment is the same as the introduction of the above embodiment, and will not be repeated here.

In one embodiment, the server obtains, at a preset time interval, the first distance between the first virtual object and the second virtual object in the virtual environment, as well as the second distance between the first virtual object and the third virtual object in the virtual environment. For example, the server obtains the first distance and the second distance once every 1 s.

In another embodiment, the server may determine next time of obtaining a distance corresponding to the current time according to a distance between the first virtual object and the virtual object controlled by the player at the current time. Exemplarily, the first distance is taken as an example. The server determines a time interval between the current time and next time of obtaining the first distance on the basis of the obtained first distance. In an embodiment, if the first distance is relatively large, the time interval between the current time and the next time of obtaining the first distance is relatively large. If the first distance is relatively small, the time interval between the current time and the next time of obtaining the first distance is relatively small.

In another embodiment, a surrounding region of the virtual object controlled by the layer may be divided into a plurality of distance ranges. The server may also determine next time of obtaining a distance corresponding to the current time according to a distance range of a distance between the first virtual object and the virtual object controlled by the player at the current time. Exemplarily, the first distance is taken as an example. If the first distance is within a target distance range among at least two distance ranges corresponding to the second virtual object, the server determines a next time interval of obtaining the first distance according to a time interval corresponding to the target distance range. In one embodiment, the server uses a LOD layering technology to perform distance range division on the virtual object controlled by the player, thereby determining a time interval of obtaining the first or second distance. The second virtual object is taken as an example. FIG. 3 shows a schematic diagram of an LOD layering technology provided according to another exemplary embodiment of this disclosure.

The server uses the LOD layering technology to divide a region centered by a second virtual object 305 into three layers. LOD2 301 is a third layer farthest from the second virtual object 305; LOD1 302 is a second layer farther from the second virtual object 305; and LOD0 303 is a first layer closest to the second virtual object 305. FIG. 3 also shows a first virtual object 304. The first virtual object 304 is located in LOD0 303. In an embodiment, a circle radius of the third layer is 8000 cm; a circle radius of the second layer is 4000 cm; and a circle radius of the first layer is 1000 cm. In an embodiment, LOD layer setting will not be performed on regions beyond LOD2 301.

As shown in FIG. 3, after determining a LOD level corresponding to the second virtual object 305, the server may determine, on the basis of the first distance between the first virtual object 304 and the second virtual object 305, a target level at which the first virtual object 304 is located, and then determine a time interval of obtaining the first distance corresponding to the target level. For example, if the first virtual object 304 is at the third layer (LOD2), a next time interval of obtaining the first distance is 2 s. If the first virtual object 304 is at the second layer (LOD1), a next time interval of obtaining the first distance is 1 s. If the first virtual object 304 is at the first layer, a next time interval of obtaining the first distance is 0.5 s.

In an embodiment, this embodiment of this disclosure does not limit a quantity of virtual objects controlled by players, and does not limit a quantity of player objects needing to obtain distances to the first virtual object. That is, there may be a third distance, a fourth distance, and the like.

Step 260: Determine, on the basis of the first distance in a case that the first distance is less than the second distance, that the first virtual object is controlled through a second behavior tree. For example, a behavior tree is selected based on the first distance among plural behavior trees for controlling the first virtual object. The first distance inversely relates to an amount of computing resources consumed during use of the selected behavior tree.

The first distance and a resource consumed during running of the second behavior tree are in a negative correlation. That the first distance and the resource consumed during running of the second behavior tree are in the negative correlation may be understood that the larger the first distance, the fewer resources consumed by the second behavior tree, and the smaller the first distance, the more resources consumed by the second behavior tree. Resources consumed by a behavior tree can be determined according to the complexity of the behavior tree or an update frequency of the behavior tree: The higher the complexity of the behavior tree, the more resources consumed by the behavior tree; and the higher the update frequency of the behavior tree, the more resources consumed by the behavior tree.

The second behavior tree may be obtained by changing the complexity of the first behavior tree according to the first distance, or by changing the update frequency of the first behavior tree according to the first distance, or by directly using a second behavior tree different from the first behavior tree. This embodiment of this disclosure does not limit this.

In a case that the first distance is less than the second distance, the first virtual object is closer to the second virtual object, which can preferentially ensure a feeling of the player corresponding to the second virtual object on the representation of the first virtual object, thereby improving the player experience and improving the representation reasonability of the NPC.

In one embodiment, on the basis that the surrounding region of the virtual object controlled by the player is divided into a plurality of distance ranges, a process of determining the second behavior tree may be as follows: The server determines, on the basis that the first distance falls within a target distance range among at least two distance ranges corresponding to the second virtual object, that the first virtual object is controlled through the second behavior tree corresponding to the target distance range.

Each distance range corresponds to one second behavior tree, that is, the at least two distance ranges correspond to at least two second behavior trees one by one. The closer to the distance range of the second virtual object, the more resources consumed by the corresponding second behavior tree during running, and the farther from the distance range of the second virtual object, the fewer resources consumed by the corresponding second behavior tree during running.

Schematically, the server determines, through the LOD layering technology, the target level at which the first virtual object is located, and determines that the first virtual object is controlled through the second behavior tree corresponding to the target level. Referring to FIG. 3 (the third virtual object is not shown), it can be determined, on the basis of the first distance between the first virtual object 304 and the second virtual object 305, that the first virtual object 304 is at the first layer LOD0 303, and the server determines that the first virtual object is controlled through the second behavior tree corresponding to the first layer LOD0 303. The number of resources consumed by the behavior tree corresponding to the first layer LOD0 303, the number of resources consumed by the behavior tree corresponding to the second layer LOD1 302, and the number of resources consumed by the behavior tree corresponding to the third layer LOD2 301 are sorted from large to small.

In one embodiment, the server determines, on the basis that the second distance falls within a target distance range among at least two distance ranges corresponding to the third virtual object in a case that the first distance is greater than the second distance, that the first virtual object is controlled through the second behavior tree corresponding to the target distance range.

Figure 4:
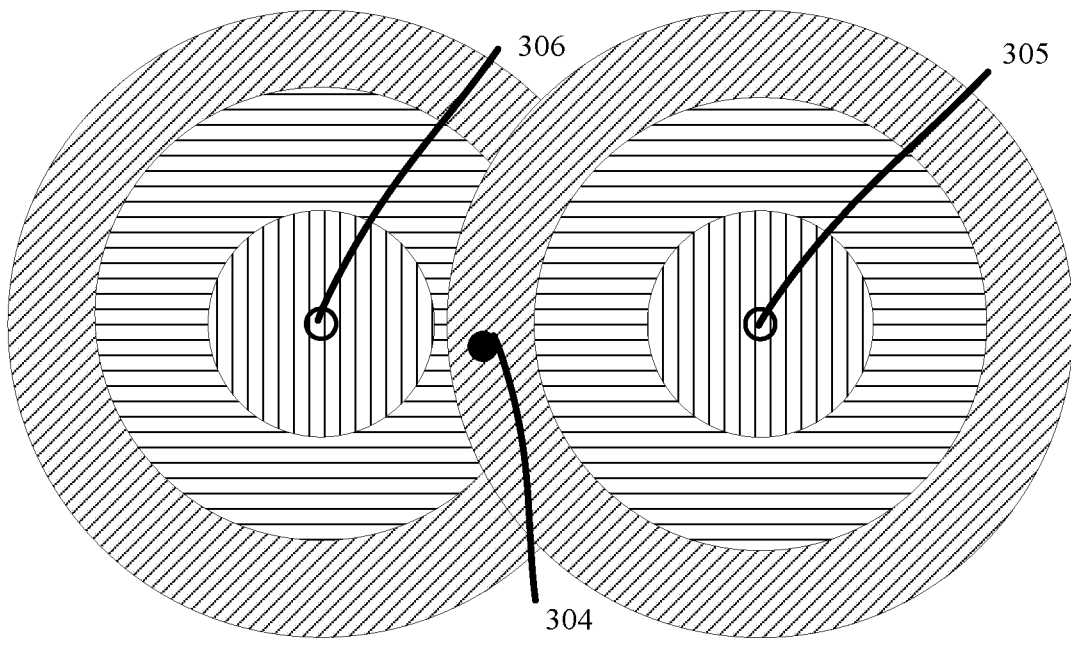
FIG. 4 shows a schematic diagram of an LOD layering technology provided according to another exemplary embodiment of this disclosure.

Referring to FIG. 4, at this time, the first distance between the first virtual object 304 and the second virtual object 305 is greater than the second distance between the first virtual object 304 and the third virtual object 306, that is, the first virtual object 304 is located on the third layer of the second virtual object 305, while the first virtual object 304 is located on the second layer of the third virtual object 306. Therefore, it is determined that the second behavior tree corresponding to the second layer controls the first virtual object 304.

The above second behavior tree may refer to any behavior tree determined from a behavior tree set (including the first behavior tree) corresponding to the first virtual object according to the first distance. The behavior tree set corresponding to the first virtual object may be preloaded, so that switching of behavior trees can be directly realized, and the transformation efficiency of NPC representation can be improved. In one embodiment, the second behavior tree may be obtained by replacing or adjusting the first behavior tree. The specific two situations will be explained in the following embodiments.

In one embodiment, the first behavior tree and the second behavior tree are both UE4 behavior trees.

Figure 5:
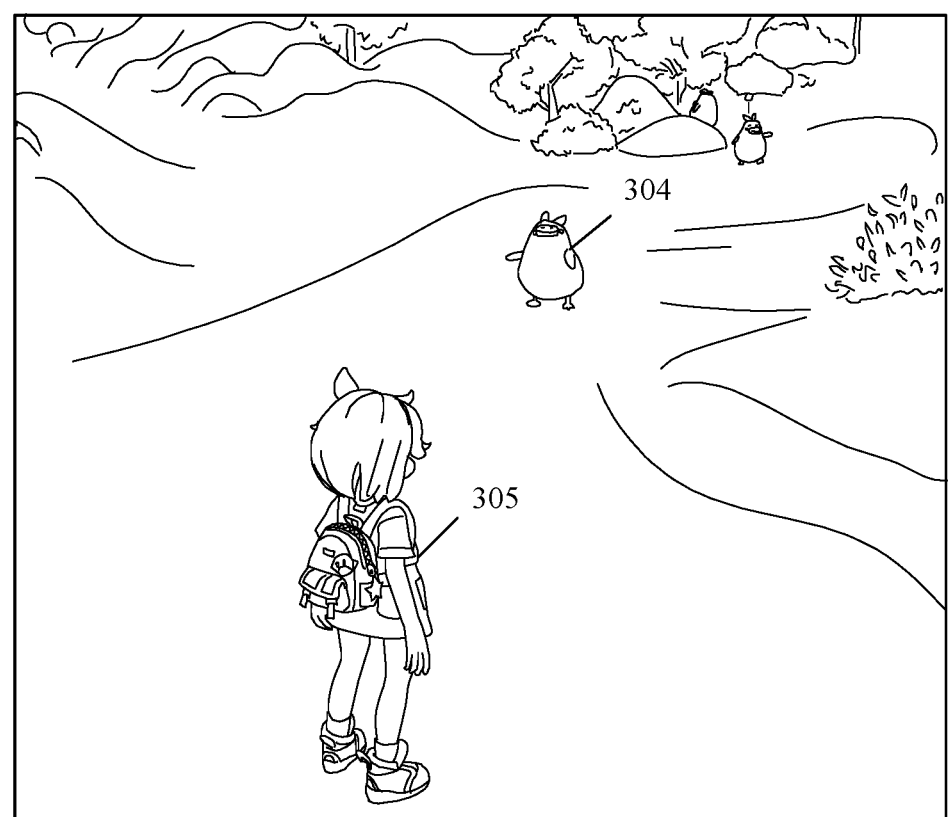
FIG. 5 shows a schematic diagram of a representation of a first virtual object provided according to one exemplary embodiment of this disclosure.
Figure 6:
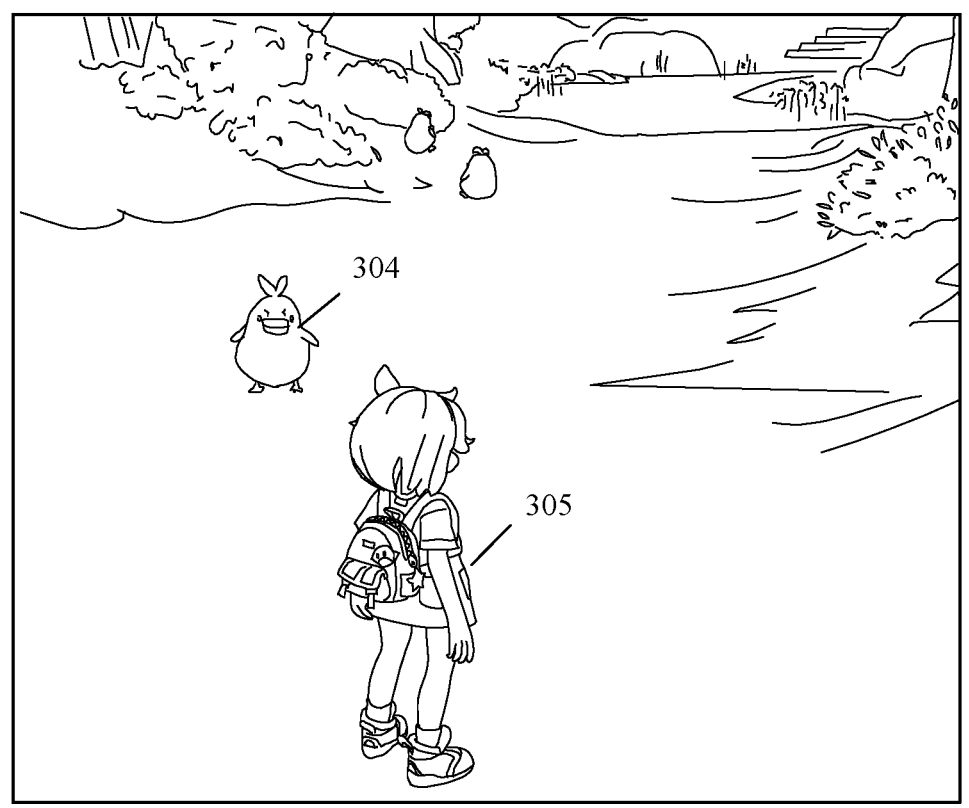
FIG. 6 shows a schematic diagram of a representation of a first virtual object provided according to another exemplary embodiment of this disclosure.

Exemplarily, FIG. 5 shows a schematic diagram of a representation of a first virtual object provided according to one exemplary embodiment of this disclosure. The first virtual object 304 is located at LOD1 (the second layer) corresponding to the second virtual object 305, and at this time, the first virtual object 304 is continuously observing the second virtual object 305. Referring to FIG. 6, after the second virtual object 305 or the first virtual object 304 moves, the first virtual object 304 is located at LOD0 (the first layer) corresponding to the second virtual object 305, and at this time, the first virtual object 304 will be far away from the second virtual object 305. The representation of the first virtual object 304 controlled by the second behavior tree corresponding to LOD0 is richer than the representation of the first virtual object 304 controlled by the second behavior tree corresponding to LOD1.

Figure 7:
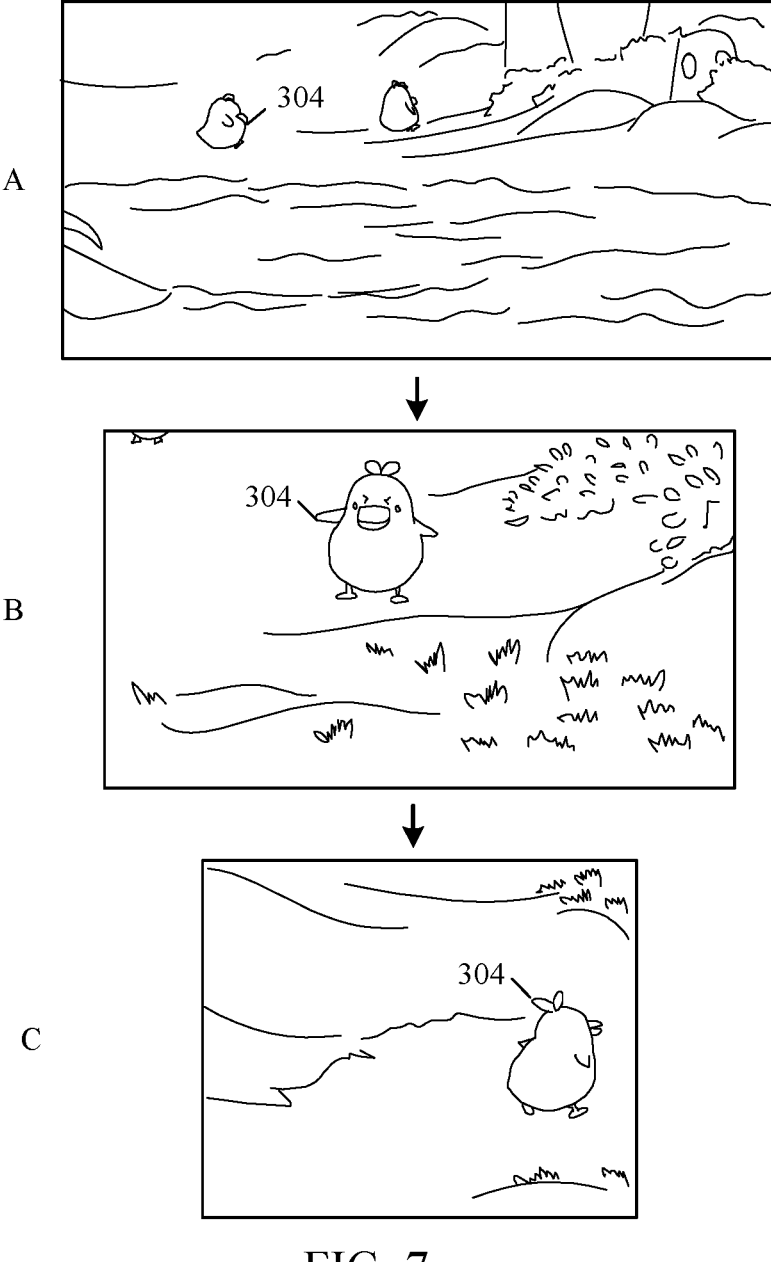
FIG. 7 shows a schematic diagram of representations of a first virtual object at different LODs provided according to one exemplary embodiment of this disclosure.

In one embodiment, FIG. 7 shows a schematic diagram of representations of a first virtual object at different LODs provided according to one exemplary embodiment of this disclosure. The virtual object controlled by the player in FIG. 7 correspond to layer LOD0, layer LOD1, and layer LOD2. According to FIG. 7(A), at this time, the first virtual object 304 is located at layer LOD2, and the first virtual object 304 is performing self-interaction (patrolling, arguing with other NPCs, sleeping, and the like). According to FIG. 7(B), at this time, the first virtual object 304 is located at layer LOD1, and the first virtual object 304 is constantly observing the second virtual object (also referred to as an alert state). According to FIG. 7(C), at this time, the first virtual object 304 is located at layer LOD0, and the first virtual object 304 is running away from the second virtual object.

In an embodiment, in a case that the first distance is equal to the second distance, it can be determined, on the basis of the first distance or the second distance, that the first virtual object is controlled through the second behavior.

When the first virtual object only falls within the preset range of the second virtual object, it can be directly determined, according to the first distance between the first virtual object and the second object in the virtual environment, that the first virtual object is controlled through the second behavior tree.

In a case that the first virtual object does not fall within the preset range of any second virtual object, or no virtual object controlled by the player can observe the first virtual object, the first virtual object may not be controlled using a behavior tree, or the first virtual object is only controlled to stand still.

In conclusion, the behavior tree for controlling the first virtual object is determined on the basis of the first distance between the first virtual object and the second virtual object, so that the behavior tree for controlling the first virtual object is always in a dynamically adjusted state. That is, NPCs closer to and farther from the second virtual object will be controlled through different behavior trees. The behavior tree used by the closer NPC consumes a large number of resources, and the behavior tree used by the farther NPC consumes a small number of resources. Total computer device resources consumed by a large number of NPCs will be maintained in a balance state, so that the computer device resources will not be excessively consumed, thereby reducing a running load of the computer device. Meanwhile, when an NPC is close to the second virtual object, the NPC has a rich representation form.

In addition, in a case that there are multiple player objects (namely, virtual objects controlled by players), target distances to behavior trees for controlling an NPC is determined by comparing distances between the NPC and the player objects, so that the behavior trees of the NPCs are more reasonable, thereby improving the representation reasonability of the NPC.

In addition, by performing distance range layering on the virtual objects controlled by the players, the behavior trees used for controlling the NPCs are determined according to different distance ranges within which the NPCs fall, so that layered management of the behavior trees of the NPCs is achieved, thereby achieving that the representations of the closer NPCs are rich and the representations of the farther NPCs are simple, which further ensures that the closer NPCs have a rich representation form and reduces the loss of the computer device resources. In addition, by determining that the first distance falls within the preset target distance range, the NPC is controlled through the second behavior tree corresponding to the target distance range, which further provides the way of determining a second behavior tree based on a distance, thus enriching the way of determining a second behavior tree.

Based on the embodiment shown in FIG. 2, an example in which the first distance is less than the second distance is taken. Step 260 can be replaced with step S3 (including step S31 and step S32):

S31: Replace the first behavior tree with the second behavior tree on the basis of the first distance.

S32: Determine that the first virtual object is controlled through the second behavior tree.

At this time, the second behavior tree is obtained by replacing the first behavior tree, and the second behavior tree corresponds to the first distance.

In one embodiment, if the first behavior tree is a behavior tree corresponding to a first distance range, and the second behavior tree is a behavior tree corresponding to a second distance range, and the first distance range is greater than the second distance range, the server may replace the first behavior tree with the second behavior tree, so that the complexity of the behavior tree controlling the first virtual object is higher. The complexity can be understood as server performance consumed by running of the behavior tree. If there are more branches in a behavior tree, more decorator nodes in a behavior tree, or more service nodes in a behavior tree, the behavior tree consumes higher server performance.

Schematically, according to the schematic diagram of LOD layering shown in FIG. 3, the first behavior tree is a behavior tree corresponding to any one of layer LOD0 303, layer LOD1 302 and layer LOD2 301. The second behavior tree is a behavior tree corresponding to another layer except the layer corresponding to the first behavior tree. For example, the first behavior tree corresponds to LOD1 302, and the second behavior tree corresponds to LOD0 303. In an embodiment, in a case that the LOD level of the first virtual object does not change, the behavior tree of the first virtual object does not change.

Before replacing the first behavior tree with the second behavior tree, the server may also preload the second behavior tree, so that the replacement of the behavior tree can be achieved by simply stopping the first behavior tree and starting the second behavior tree, which improves the replacement efficiency of the behavior tree.

In some feasible embodiments, the server replaces the first behavior tree with the second behavior tree, so that an update cycle of the behavior tree that controls the first virtual object is prolonged. The update cycle can be used for representing an update frequency of an output of the behavior tree. The shorter the update cycle, the greater the update frequency.

In conclusion, replacing the first behavior tree with the second behavior tree provides a way of switching the behavior tree that controls the first virtual object, and enriches the way of switching the behavior tree. In addition, due to the preloading of the behavior tree in a behavior library, only simple stop and start of the behavior trees are required during the replacement, which avoids the overheads of creating a behavior tree and improves the replacement efficiency of the behavior tree.

Based on the embodiment shown in FIG. 2, an example in which the first distance is less than the second distance is taken. Step 260 can also be replaced with step S4 (including step S41, step S42, and step S43):

S41: Adjust a first update cycle of the first behavior tree into a second update cycle on the basis of the first distance.

The first update cycle and the second update cycle are used for indicating a time interval of outputting two adjacent decisions by the first behavior tree. Schematically, referring to FIG. 1, the first update cycle and the second update cycle are used for indicating a time interval between time of determining to execute the task node 106 and time of determining to execute the task node 107 in the first behavior tree, and the update cycle can also be represented by an update frequency, or the like which can be calculated through simple mathematical transformation.

In one embodiment, according to the schematic diagram of LOD layering shown in FIG. 3, the first distance corresponds to the second update cycle, which can be understood that the first distance range with the first distance corresponds to the second update cycle, that is, a target level at which the first virtual object is located corresponds to the second update cycle. For example, the update cycle of layer LOD0 is shortest, which is 100 ms. The update cycle of layer LOD1 is moderate, which is 500 ms. The update cycle of layer LOD3 is longest, which is 1000 ms.

The server adjusts the first update cycle of the first behavior tree into the second update cycle on the basis of the first distance. In an embodiment, the update cycle of the first behavior tree is not adjusted in a case that the LOD level of the first virtual object does not change. In a case that the first virtual object is beyond the LOD level distribution of the second virtual object, the first behavior tree can be stopped from outputting a decision.

S42: Determine the first behavior tree using the second update cycle as the second behavior tree.

The server determines the first behavior tree using the second update cycle as the second behavior tree.

S43: Determine that the first virtual object is controlled through the second behavior tree.

The server determines that the first virtual object is controlled through the second behavior tree, and the update cycle of the second behavior tree is the second update cycle at this time.

In one embodiment, step S5 is further included after step S4.

S5: Adjust a third update cycle of a service node of the first behavior tree into a fourth update cycle.

The fourth update cycle corresponds to the first distance. The service node is used for updating data used for running the first behavior tree. The third update cycle and the fourth update cycle are used for indicating a time interval between two adjacent updates performed by the service node.

In the first behavior tree or the second behavior tree, the service node is usually connected to a composites node or a task node. As long as their branches are executed, these nodes will be executed at a defined time interval. The service node is often used for checking and updating a blackboard. In the UE4 behavior tree, the service node replaces a traditional Parallel node in another behavior tree system. The service node will not have any return value, and will not directly affect an execution flow.

In conclusion, the behavior tree for controlling the first virtual object is always in a dynamically adjusted state by adjusting the update cycle of the first behavior tree. NPCs closer to and farther from the second virtual object will be controlled through different behavior trees with different update cycles. The behavior tree used by the closer NPC has a short update cycle, and the behavior tree used by the farther NPC has a long update cycle. Total computer device resources consumed by a large number of NPCs will be maintained in a balance state, so that the computer device resources will not be excessively consumed, thereby reducing a running load of the computer device. Meanwhile, when an NPC is close to the second virtual object, the NPC has a rich representation form, and the representation of the NPC is updated in real time.

The above scheme also adaptively adjusts the update cycle of the service node of the first behavior tree while adjusting the update cycle of the first behavior tree, so that the adjusted update cycle of the service node is compatible with both the first distance and the adjusted update cycle of the first behavior tree, which further ensures that the computer device resources will not be excessively consumed and ensures normal running of the first behavior tree, so that the NPC has a normal representation.

In the embodiment shown in FIG. 2, after step 260, step S6 is further included.

S6: Perform, in the process of controlling the first virtual object through the second behavior tree, condition determi-nation once on m decorator nodes after target data is updated for the last time within a $k^{th}$ update cycle of the second behavior tree.

The target data is input data used for running the second behavior tree. One sequence node of the second behavior tree is attached with the m decorator nodes. The sequence node is used for returning a success value in a case that all child nodes of the sequence node return a success value; and the decorator nodes are used for performing at least one action of determining whether to or not to execute a branch where the sequence node is located, determining to interrupt the branch where the sequence node is located, and deter-mining to interrupt a low-priority branch of the branch where the sequence node is located; and m and k are positive integers.

Step S6 can be replaced with step S61 and step S62.

S61: Mark, in the process of controlling the first virtual object through the second behavior tree, a current number of updates of the blackboard value on the sequence node in a case that a blackboard value is updated for the $i^{th}$ time.

The sequence node is attached with the m decorator nodes, and the m decorator nodes pay attention to the same blackboard value. The blackboard value is updated for n times within the $k^{th}$ update cycle of the second behavior tree. The blackboard value is data used for running the first behavior tree. For example, referring to FIG. 1, the decorator node 104 pays attention to a blackboard value, namely, light intensity. At this time, only one decorator node 104 is attached to the sequence node 105.

Figure 8:
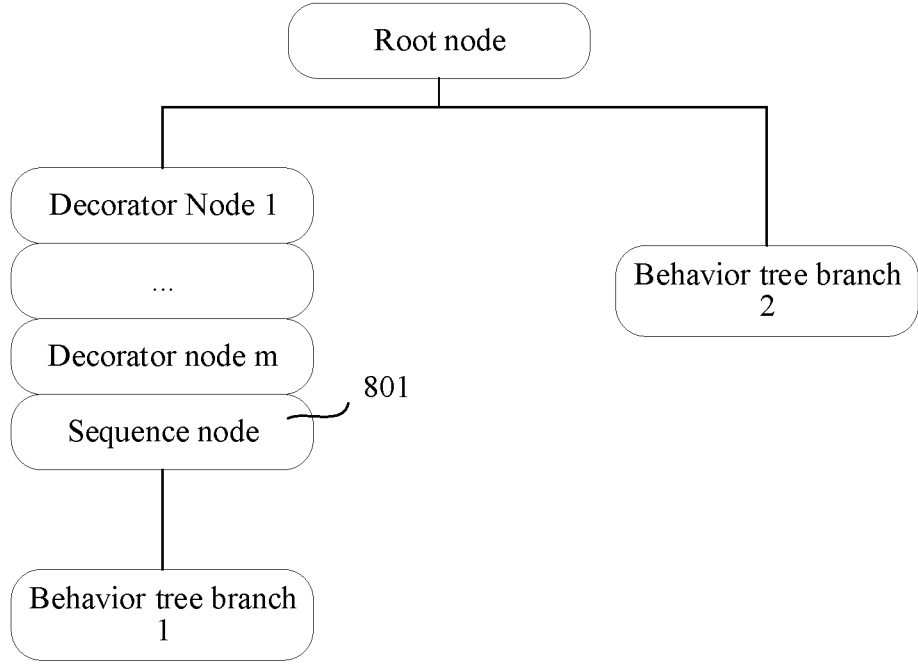
FIG. 8 shows a schematic diagram that m decorator nodes are attached to one sequence node according to one exemplary embodiment of this disclosure.

There are m decorator nodes on the sequence node. Referring to FIG. 8, there are m decorator nodes attached to a sequence node 801, and the m decorator nodes pay attention to the same blackboard value. For example, the blackboard value is light intensity. Schematically, decorator node 1 calculates a light intensity that is greater than 2000; decorator node 2 calculates a light intensity that is less than 4000; decorator node 3 calculates a ratio of a light intensity to an air humidity that is greater than 5; and decorator node 4 calculates a ratio of a light intensity to an ambient temperature that is greater than 10.

The blackboard value is updated for n times within the update cycle of the second behavior tree, that is, the black-board value is updated for n times in the time interval of outputting two adjacent decisions by the first behavior tree. For example, a previous decision controls the first virtual object to obtain a shade position, and a latter decision controls the first virtual object to move to the shade position. The light intensity is updated for n times by the service node between the two decisions.

In one embodiment, the sequence node is used for return-ing a success value when all child nodes of the sequence node return a success value. The decorator node is used for determining to execute the branch of the second behavior tree and to interrupt the execution of the branch of the second behavior tree. The blackboard value is stored in a blackboard that matches the second behavior tree, and m, k, and n are all positive integers.

S62: Obtain m calculation results of the m decorator nodes based on the blackboard value after the blackboard value is updated for the $n^{th}$ time, and perform condition determination once on the basis of the m calculation results.

After the blackboard value is updated for n times, the server obtains the m calculation results of the m decorator nodes based on the blackboard value. The server performs the condition determination once on the basis of the m calculation results. The condition determination is used for performing at least one action of: determining to or not to execute the branch where the sequence node is located, determining to interrupt the branch where the sequence node is located, and determining to interrupt the low-priority branch of the branch where the sequence node is located.

In one embodiment, when the blackboard value is updated for the $i^{th}$ time, the m decorator nodes will be notified in a traversing manner. The above step S61 may be replaced with a step of "marking the sequence node once in a case that one of the m decorator nodes is notified, so that the sequence node is marked form times totally during the $i^{th}$ update of the blackboard value". The above step S62 may be replaced with a step of "obtaining the m calculation results of the m decorator nodes based on the blackboard value after the sequence node is marked for m*n times".

Figure 9:
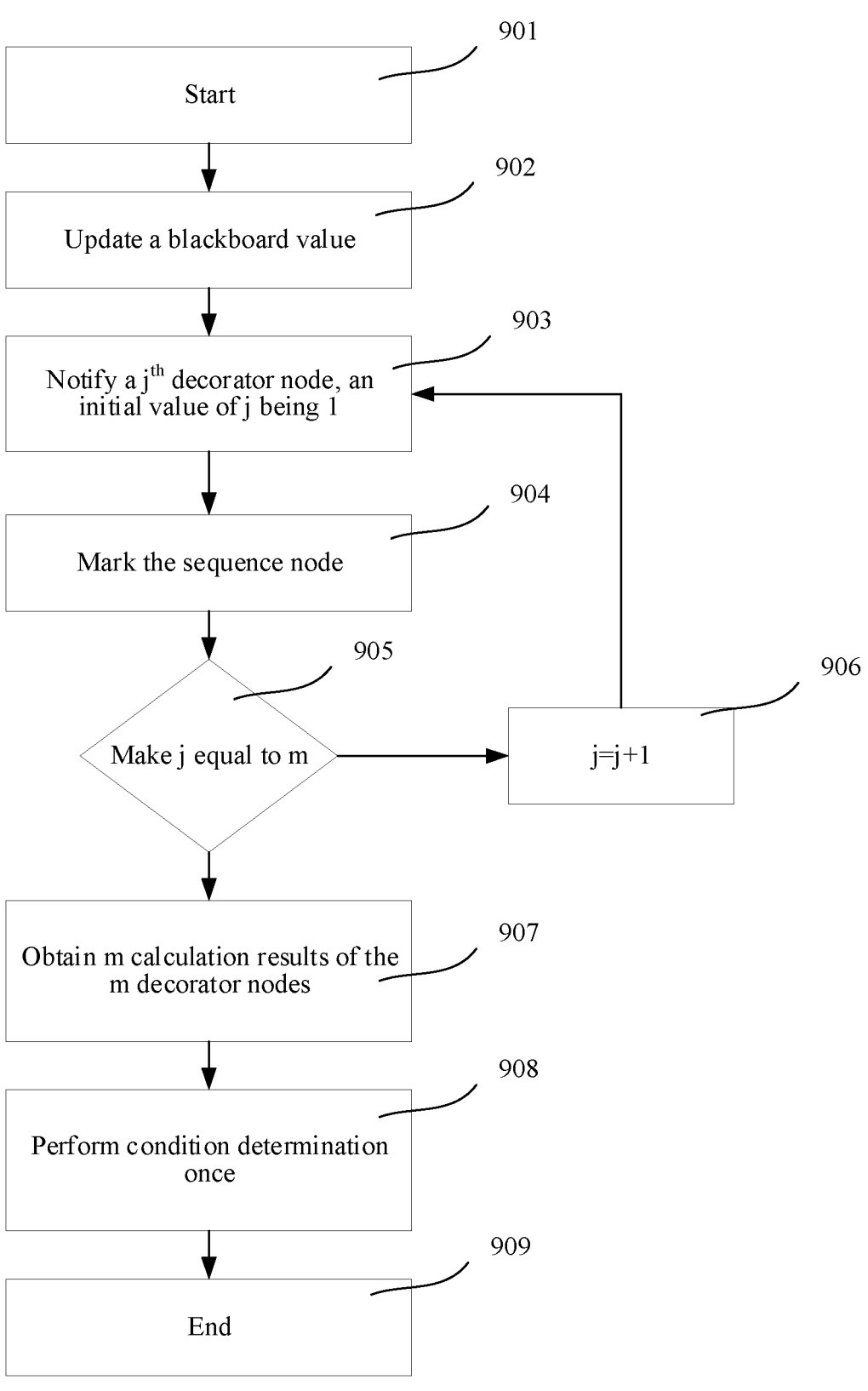
FIG. 9 shows a flowchart of performing condition determination once according to one exemplary embodiment of this disclosure.

Schematically, the sequence node will be marked at each time when the blackboard value is updated. FIG. 9 shows a flowchart of performing condition determination once according to one exemplary embodiment of this disclosure.

901: Start.

The server starts the flow of marking the sequence node on the basis of a once updated blackboard value.

902: Update the blackboard value.

The server updates, through the service node, the same blackboard value to which the m decorator nodes pay attention.

903: Notify a $j^{th}$ decorator node, an initial value of j being 1.

The server will notify the $j^{th}$ decorator node that the blackboard value has been updated.

904: Mark the sequence node.

The server will mark the sequence node once after each decorator node is notified.

905: Make j equal to m.

The server determines whether the m decorator nodes have been all notified. If yes, the server executes step 907. If no, the server executes step 906.

906: j=j+1.

The server updates the value of j to j+1, and starts to execute step 903 again.

907: Obtain m calculation results of the m decorator nodes.

The server obtains the m calculation results of the m decorator nodes, and each decorator node will perform an independent calculation on the blackboard value once in a calculation way of comparing the blackboard value with a preset value.

908: Perform condition determination once.

The server performs the condition determination once on the basis of the m decorator nodes. For example, the server obtains the m calculation results of the m decorator nodes. If the first to $m^{th}$ calculation results are all true, a condition determination result is true. If there is one of the first to $m^{th}$ calculation results is false, a condition determination result is false.

The condition determination is used for performing at least one action of determining whether to or not to execute a branch where the sequence node is located, determining to interrupt the branch where the sequence node is located, and determining to interrupt a low-priority branch of the branch where the sequence node is located.

909: End.

The server ends the flow of marking the sequence node on the basis of the once updated blackboard value.

In conclusion, by optimizing the condition determination process of the decorator nodes within one update cycle, only one condition determination is performed within one update cycle. Compared with the condition determination process in the related technology of this disclosure, this disclosure avoids unnecessary performance loss in a running process of a behavior tree, reduces a running load of a computer device, shortens the running time of the behavior tree, and optimizes the performance of the computer device.

In the relevant technology of this disclosure, if there are multiple decorator nodes on one sequence node, and these decorator nodes all pay attention to a blackboard value, there will be a significant performance overhead as the blackboard value changes. Referring to FIG. 8, if all the m decorator nodes on the sequence node 801 pay attention to the blackboard value, namely, the light intensity, when the light intensity changes, the m decorator nodes will be notified one by one in a traversing manner. After each decorator node is notified, the server will calculate the results of the m decorator nodes and then perform the condition determination once. In this way, m condition determinations may occur at each time the blackboard value is modified. If the blackboard value is modified for n times during the current update of the behavior tree, up to m*n condition determinations will occur. However, the technical solution provided by this embodiment of the application only needs one determination, thereby reducing the running costs and running time of the behavior tree.

Figure 10:
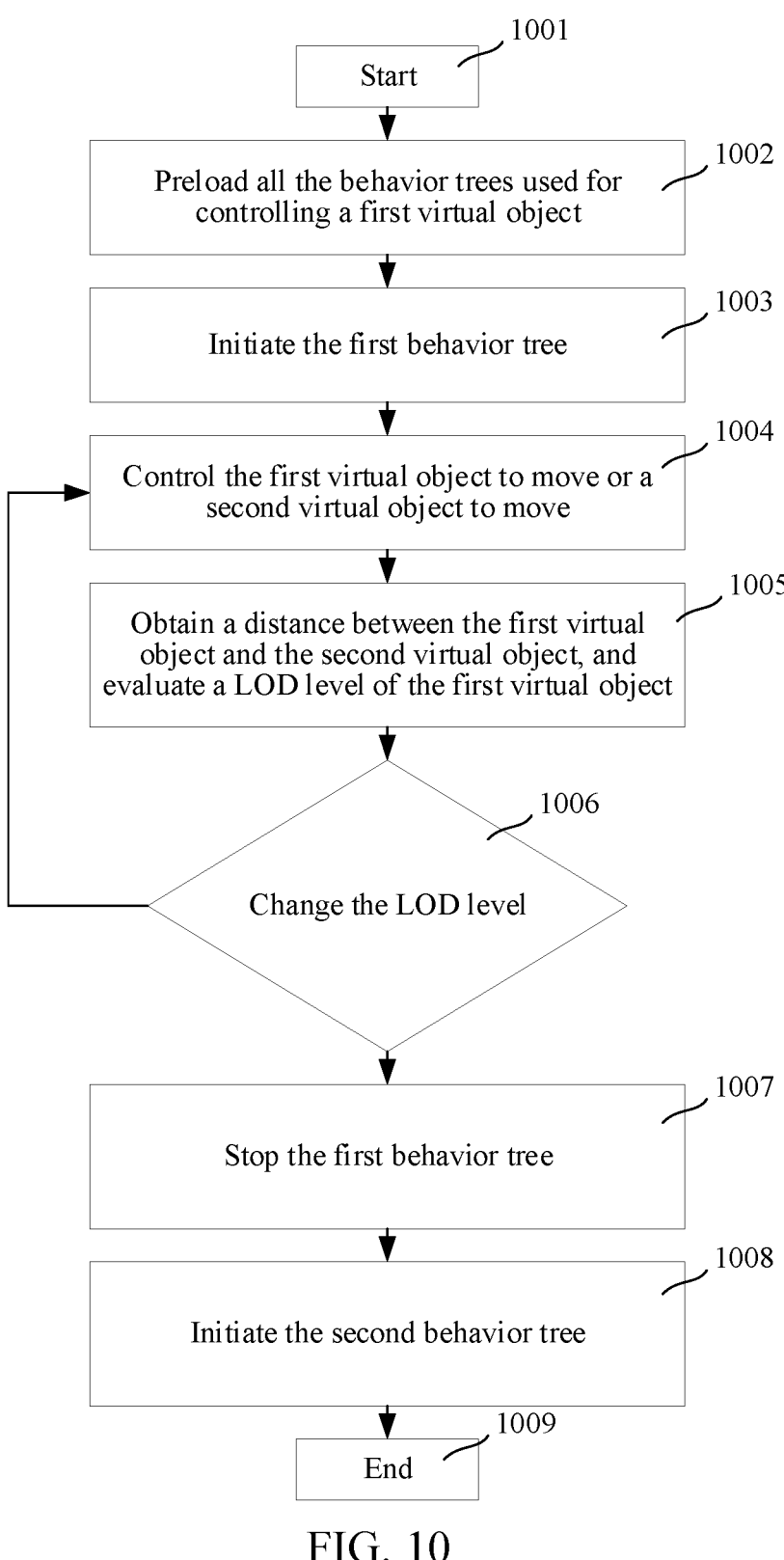
FIG. 10 shows a flowchart of a virtual object control method provided according to another exemplary embodiment of this disclosure.

To ensure that an NPC can achieve a rich representation form even under a condition of limited computer device resources, FIG. 10 shows a flowchart of a virtual object control method provided in another exemplary embodiment of this disclosure. The method is exemplified by running in a server. The method includes:

Step 1001: Start.

The server starts to perform the virtual object control method provided in this embodiment.

Step 1002: Preload all the behavior trees used for controlling a first virtual object.

Before determining a behavior tree controlling the first virtual object, the server preloads all the behavior trees used for controlling the first virtual object. All the behavior trees include a first behavior tree and a second behavior tree. In this embodiment of this disclosure, the second behavior tree is a behavior tree different from the first behavior tree, that is, the second behavior tree is obtained by replacing the first behavior tree.

Step 1003: Initiate the first behavior tree.

The server initiates the first behavior tree to control the first virtual object. The first behavior tree may be a behavior tree where there is no virtual object controlled by a played within a preset range of the first virtual object, and may be referred to as an initial behavior tree. The first behavior tree may also be a behavior tree controlling the first virtual object when all players cannot observe the first virtual object. The first behavior tree may also be a behavior tree controlling the first virtual object when the first virtual object has been already within an observation range of a player.

Step 1004: Control the first virtual object to move or a second virtual object to move.

The server controls the first virtual object to move through the first behavior tree, or the server controls the second virtual object to move. The first virtual object is an NPC. The second virtual object is a virtual object controlled by a player.

Step 1005: Obtain a distance between the first virtual object and the second virtual object, and evaluate a LOD level of the first virtual object.

The server may periodically obtain a first distance between the first virtual object and the second virtual object, and evaluate, through a LOD layering technology, a level at which the first virtual object is located. The server may use the LOD layering technology to divide a spatial distance of the first virtual object into at least two levels according to the distance by taking the second virtual object as a circle center. For example, a distance range indicated by a first layer is 0 to 50; a distance range indicated by a second layer is 50 to 100; and a distance range indicated by a third layer is 100 to 150. If the first distance is 75, it is determined that the first virtual object is located at the second layer.

Step 1006: Change the LOD level.

The server determines whether the level at which the first virtual object is located changes. If yes, the server executes step 1007. If no, the server executes step 1005 and continues to control the first virtual object through the first behavior tree.

Step 1007: Stop the first behavior tree.

The server stops controlling the first virtual object through the first behavior tree.

Step 1008: Initiate the second behavior tree.

The server initiates the second behavior tree, and controls the first virtual object through the second behavior tree.

Step 1009: End.

The server ends the performing the virtual object control method provided in this embodiment.

The following will introduce a virtual object display method provided by the embodiments of this disclosure. Applying the method to a terminal (or a client run on the terminal) is exemplified. The method includes the following three steps:

1. Display a first virtual object, a second virtual object, and a third virtual object.

In one embodiment, the terminal displays a first virtual object, a second virtual object, and a third virtual object in a virtual environment, where the first virtual object is an NPC. In an embodiment, the first virtual object refers to an NPC with anthropomorphic behaviors. In an open world game, the first virtual object can also be referred to as an AI object. The AI object does activities in a virtual environment through its own control logic.

The second virtual object refers to a virtual object controlled by a player, and the third virtual object refers to a virtual object controlled by another player. The second virtual object is taken as an example. The terminal receives an operation request performed by the player on the second virtual object, and makes a response to the request. For example, the terminal receives a request of controlling the second virtual object to run to the first virtual object, and the terminal controls the second virtual object to quickly move towards the first virtual object.

2. Display, in a case that a first distance between the first virtual object and the second virtual object in a virtual environment is less than a second distance between the first virtual object and the third virtual object in the virtual environment and that the first distance is p, that the first virtual object performs a first quantity of actions.

3. Display, in a case that the first distance is q, that the first virtual object performs a second quantity of actions, p being greater than q, and the first quantity being less than the second quantity; or, p being less than q, and the first quantity being greater than the second quantity.

In one embodiment, if p is greater than q, the first quantity is less than the second quantity; or, if p is less than q, the first quantity is greater than the second quantity. It can be understood that in a case that the first distance is less than the second distance, when the distance between the first virtual object and the second virtual object is shortened, that is, when the first distance gradually decreases, the quantity of actions performed by the first virtual object gradually increases. When the distance between the first virtual object and the second virtual object is prolonged, that is, when the first distance gradually increases, the quantity of actions performed by the first virtual object gradually decreases.

Schematically, in a case that the first distance is less than the second distance, if the first distance is relatively large, the first virtual object performs one action, for example: sleeping in situ. If the first distance is relatively small, the first virtual object performs four actions, for example: moving towards the second virtual object, observing the second virtual object, spitting at the second virtual object, and quickly running away from the second virtual object.

In one case, assuming that the first virtual object and the second virtual object exist in the virtual environment at a first distance, and both of them remain stationary for a period of time thereafter, the quantity of actions that are about to be performed by the first virtual object will be in negative correlation with the first distance, that is, the first distance and the overhead of the behavior tree controlling the first virtual object are in negative correlation.

In a case that the first distance is greater than the second distance, if the second distance is p, the terminal displays that the first virtual object performs the first quantity of actions. If the second distance is q, the terminal displays that the first virtual object performs the second quantity of actions.

In an embodiment, when the first virtual object only falls within a preset range of the second virtual object, if the first distance is p, the terminal displays that the first virtual object performs the first quantity of actions. If the first distance is q, the terminal displays that the first virtual object performs the second quantity of actions.

In conclusion, it is displayed, on the basis of different distances, that the first virtual object performs different quantities of actions in the virtual environment, so that a closer NPC consumes a large number of resources, and a farther NPC consumes a small number of resources. Total computer device resources consumed by a large number of NPCs will be maintained in a balance state, so that the computer device resources will not be excessively consumed, thereby reducing a running load of a computer device. Meanwhile, when an NPC is close to the second virtual object, the NPC performs more actions.

In addition, in a case that there are multiple player objects (namely, virtual objects controlled by players), a quantity of actions of an NPC needing to be displayed is determined by comparing distances between the NPC and the player objects, so that the representations of the NPC are more reasonable.

The following will introduce another virtual object display method provided by the embodiments of this disclosure. Applying the method to a terminal (or a client run on the terminal) is exemplified. The method includes the following three steps:

1. Display a first virtual object, a second virtual object, and a third virtual object, the first virtual object being an NPC, the second virtual object being a virtual object controlled by a player, and the third virtual object being a virtual object controlled by another player.

In one embodiment, the terminal displays a first virtual object, a second virtual object, and a third virtual object in a virtual environment, where the first virtual object is an NPC. In an embodiment, the first virtual object refers to an NPC with anthropomorphic behaviors. In an open world game, the first virtual object can also be referred to as an AI object. The AI object does activities in a virtual environment through its own control logic.

The second virtual object refers to a virtual object controlled by a player, and the third virtual object refers to a virtual object controlled by another player. The second virtual object is taken as an example. The terminal receives an operation request performed by the player on the second virtual object, and makes a response to the request. For example, the terminal receives a request of controlling the second virtual object to run to the first virtual object, and the terminal controls the second virtual object to quickly move towards the first virtual object.

2. Display, in a case that a first distance between the first virtual object and the second virtual object in a virtual environment is less than a second distance between the first virtual object and the third virtual object in the virtual environment and that the first distance is p, that a time interval of performing actions by the first virtual object is a first duration.

3. Display, in a case that the first distance is q, that a time interval of performing actions by the first virtual object is a second duration, p being greater than q, and the first duration being greater than the second duration; or, p being less than q, and the first duration being less than the second duration.

In one embodiment, if p is greater than q, the first duration is greater than the second duration; or, if p is less than q, the first duration is less than the second duration. It can be understood that in a case that the first distance is less than the second distance, when the distance between the first virtual object and the second virtual object is shortened, that is, when the first distance gradually decreases, the time interval of performing adjacent actions by the first virtual object gradually decreases. When the distance between the first virtual object and the second virtual object is prolonged, that is, when the first distance gradually increases, the time interval of performing adjacent actions by the first virtual object gradually increases.

Schematically, in a case that the first distance is less than the second distance, if the first distance is relatively large, the first virtual object performs two actions, for example: arguing and sleeping. A time interval between the two actions is 5 s. If the first distance is relatively small, the first virtual object performs four actions, for example: moving towards the second virtual object, observing the second virtual object, spitting at the second virtual object, and quickly running away from the second virtual object. Time intervals between the four actions are all 3 s.

In one case, assuming that the first virtual object and the second virtual object exist in the virtual environment at a first distance, and both of them remain stationary for a period of time thereafter, the time interval that the first virtual object is about to perform actions will be in positive correlation with the first distance, that is, the first distance and the overhead of the behavior tree controlling the first virtual object are in negative correlation.

In a case that the first distance is greater than the second distance, if the second distance is p, the terminal displays that the time interval of performing actions by the first virtual object is the first duration. If the second distance is q, the terminal displays that the time interval of performing actions by the first virtual object is the second duration.

In an embodiment, when the first virtual object only falls within a preset range of the second virtual object, if the first distance is p, the terminal displays that the time interval of performing actions by the first virtual object is the first duration. If the first distance is q, the terminal displays that the time interval of performing actions by the first virtual object is the second duration.

In conclusion, it is displayed, on the basis of different distances, that intervals of performing actions by the first virtual object in the virtual environment are different, so that a closer. NPC consumes a large number of resources, and a farther NPC consumes a small number of resources. Total computer device resources consumed by a large number of NPCs will be maintained in a balance state, so that the computer device resources will not be excessively consumed, thereby reducing a running load of a computer device. Meanwhile, when an NPC is close to the second virtual object, the representations of the NPC have a higher fluency.

In addition, in a case that there are multiple player objects (namely, virtual objects controlled by players), an interval of performing actions by an NPC is determined by comparing distances between the NPC and the player objects, so that the representations of the NPC are more reasonable.

Figure 11:
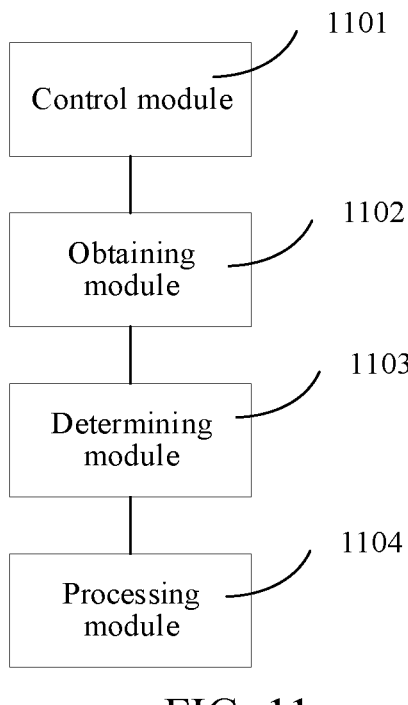
FIG. 11 shows a structural block diagram of a virtual object control apparatus provided according to one exemplary embodiment of this disclosure.

FIG. 11 shows a structural block diagram of a virtual object control apparatus provided according to one exemplary embodiment of this disclosure. The apparatus includes:

a control module 1101, configured to control a first virtual object through a first behavior tree, the first virtual object being an NPC;

an obtaining module 1102, configured to obtain a first distance between the first virtual object and a second virtual object in a virtual environment, as well as a second distance between the first virtual object and a third virtual object in the virtual environment, the second virtual object being a virtual object controlled by a player, and the third virtual object being a virtual object controlled by another player; and a determining module 1103, configured to determine, on the basis of the first distance in a case that the first distance is less than the second distance, that the first virtual object is controlled through a second behavior tree, the first distance and a resource consumed during running of the second behavior tree being in a negative correlation.

In one embodiment, the determining module 1103 is further configured to determine, on the basis that the first distance falls within a target distance range among at least two distance ranges corresponding to the second virtual object, that the first virtual object is controlled through the second behavior tree corresponding to the target distance range, each distance range corresponding to one second behavior tree.

In one embodiment, the determining module 1103 is further configured to determine, on the basis that the second distance falls within a target distance range among at least two distance ranges corresponding to the third virtual object in a case that the first distance is greater than the second distance, that the first virtual object is controlled through the second behavior tree corresponding to the target distance range.

In one embodiment, the second behavior tree is obtained by replacing the first behavior tree.

In one embodiment, the determining module 1103 is further configured to replace the first behavior tree with the second behavior tree on the basis of the first distance.

In one embodiment, the determining module 1103 is further configured to determine that the first virtual object is controlled through the second behavior tree, the second behavior tree corresponding to the first distance.

In one embodiment, the second behavior tree is obtained by adjusting the first behavior tree.

In one embodiment, the determining module 1103 is further configured to adjust a first update cycle of the first behavior tree into a second update cycle on the basis of the first distance, the first update cycle and the second update cycle being used for indicating a time interval of outputting two adjacent decisions by the first behavior tree.

In one embodiment, the determining module 1103 is further configured to determine the first behavior tree using the second update cycle as the second behavior tree.

In one embodiment, the determining module 1103 is further configured to determine that the first virtual object is controlled through the second behavior tree.

In one embodiment, the determining module 1103 is further configured to adjust a third update cycle of a service node of the first behavior tree into a fourth update cycle. The fourth update cycle corresponds to the first distance. The service node is used for updating data used for running the first behavior tree. The third update cycle and the fourth update cycle are used for indicating a time interval between two adjacent updates performed by the service node.

In one embodiment, the apparatus further includes a processing module 1104.

In one embodiment, the processing module 1104 is configured to perform, in the process of controlling the first virtual object through the second behavior tree, condition determination once on the m decorator nodes after target data is updated for the last time within a $k^{th}$ update cycle of the second behavior tree. The target data is input data used by running the second behavior tree, and one sequence node of the second behavior tree is attached with m decorator nodes. The sequence node is used for returning a success value in a case that all child nodes of the sequence node return a success value; and the decorator nodes are used for performing at least one action of determining whether to or not to execute a branch where the sequence node is located, determining to interrupt the branch where the sequence node is located, and determining to interrupt a low-priority branch of the branch where the sequence node is located; and m and k are positive integers.

In one embodiment, the target data includes a blackboard value. The blackboard value is updated for n times within the $k^{th}$ update cycle. The processing module 1104 is further configured to mark a current number of updates of the blackboard value on the sequence node in a case that the blackboard value is updated for the $i^{th}$ time, i being a positive integer not greater than n.

In one embodiment, the processing module 1104 is configured to: obtain m calculation results of the m decorator nodes based on the blackboard value after the blackboard value is updated for the $n^{th}$ time, and perform condition determination once on the basis of the m calculation results.

In one embodiment, the m decorator nodes are notified in a traversing manner in a case that the blackboard value is updated for the $i^{th}$ time.

In one embodiment, the processing module 1104 is configured to mark the sequence node once in a case that one of the m decorator nodes is notified, so that the sequence node is marked for m times totally during the $i^{th}$ update of the blackboard value.

In one embodiment, the processing module 1104 is configured to obtain the m calculation results of the m decorator nodes based on the blackboard value after the sequence node is marked for m*n times.

In one embodiment, the first behavior tree and the second behavior tree are both UE4 behavior trees.

In conclusion, the above apparatus determines the behavior tree for controlling the first virtual object on the basis of the first distance between the first virtual object and the second virtual object, so that the behavior tree for controlling the first virtual object is always in a dynamically adjusted state. That is, NPCs closer to and farther from the second virtual object will be controlled through different behavior trees. The behavior tree used by the closer NPC consumes a large number of resources, and the behavior tree used by the farther NPC consumes a small number of resources. Total computer device resources consumed by a large number of NPCs will be maintained in a balance state, so that the computer device resources will not be excessively consumed, thereby reducing a running load of the computer device. Meanwhile, when an NPC is close to the second virtual object, the NPC has a rich representation form.

In addition, in a case that there are multiple player objects (namely, virtual objects controlled by players), target distances to behavior trees for controlling an NPC is determined by comparing distances between the NPC and the player objects, so that the behavior trees of the NPCs are more reasonable, thereby improving the representation reasonability of the NPC.

Figure 12:
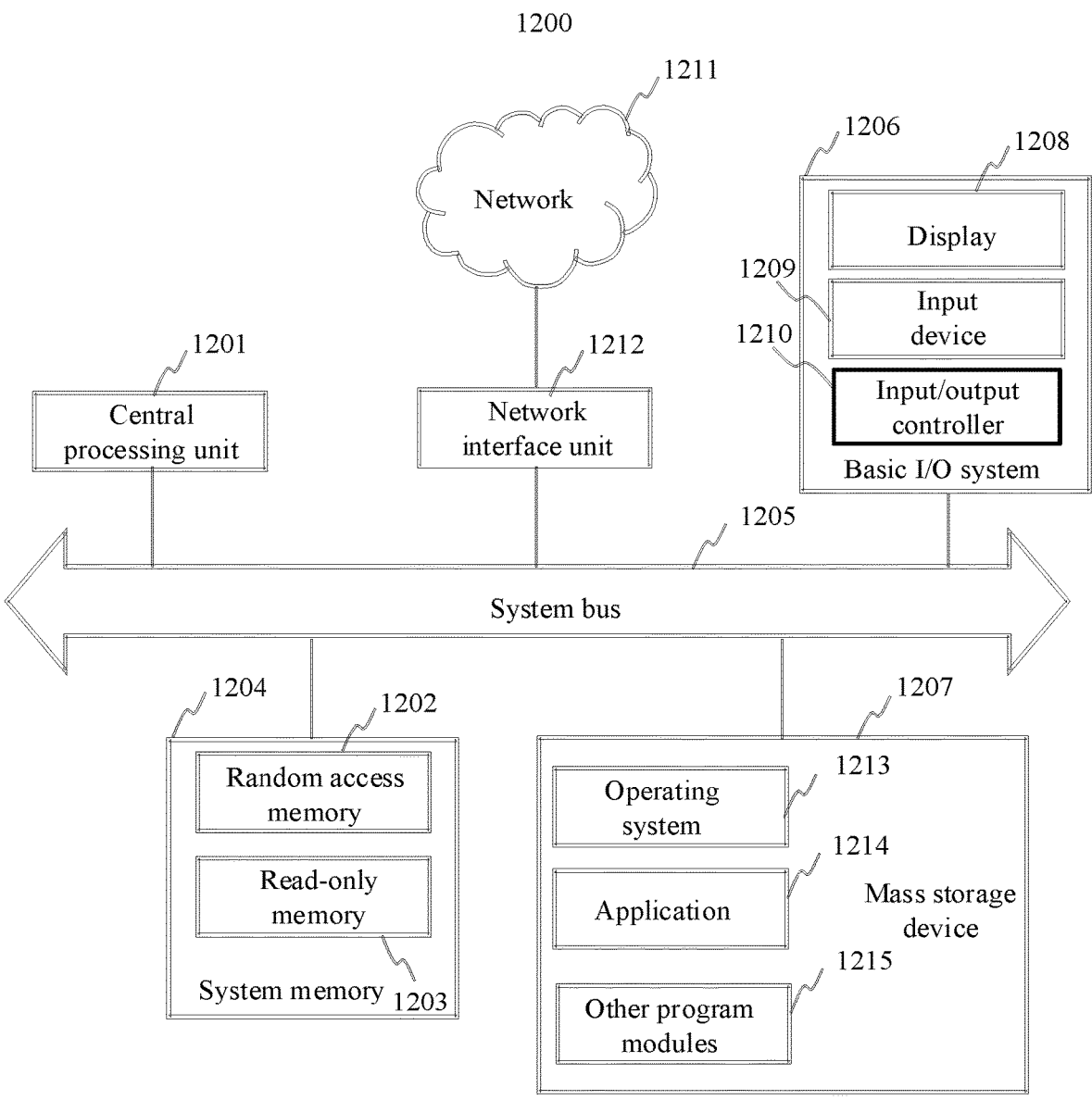
FIG. 12 is a structural block diagram of a computer device provided according to an exemplary embodiment of this disclosure.

FIG. 12 is a structural block diagram of a computer device provided according to an exemplary embodiment of this disclosure. The computer device 1200 includes a central processing unit (CPU) 1201, a system memory 1204 including a random access memory (RAM) 1202 and a read-only memory (ROM) 1203, and a system bus 1205 connecting the system memory 1204 to the CPU 1201. The computer device 1200 further includes a basic input/output (I/O) system 1206 assisting in transmitting information between components in the computer device, and a mass storage device 1207 configured to store an operating system 1213, applications 1214, and other program modules 1215.

The basic I/O system 1206 includes a display 1208 configured to display information and an input device 1209 such as a mouse or a keyboard that is used for entering information by a user. The display 1208 and the input device 1209 are both connected to the CPU 1201 by using an input/output controller 1210 connected to the system bus 1205. The basic I/O system 1206 may further include the input/output controller 1210 to be configured to receive and process inputs from a plurality of other devices such as a keyboard, a mouse, and an electronic stylus. Similarly, the input/output controller 1210 further provides an output to a display screen, a printer, or another type of output device.

The mass storage device 1207 is connected to the CPU 1201 by using a mass storage controller (not shown) connected to the system bus 1205. The mass storage device 1207 and a computer device-readable medium associated with the mass storage device provide non-volatile storage for the computer device 1200. That is, the mass storage device 1207 may include a computer device-readable medium (not shown) such as a hard disk or a compact disc ROM (CD-ROM) drive.

In general, the computer device-readable medium may include a computer device storage medium and a communication medium. The computer device storage medium includes volatile and non-volatile media, and removable and non-removable media implemented by using any method or technology used for storing information such as computer device-readable instructions, data structures, program modules, or other data. The computer device storage media include a RAM, a ROM, an Erasable Programmable Read Only Memory (EPROM), an Electrically Erasable Programmable Read-Only Memory (EEPROM), a CD-ROM, a Digital Video Disc (DVD) or another optical storage, a tape cartridge, a magnetic cassette, a magnetic disk storage, or another magnetic storage device. Certainly, a person skilled in the art may learn that the computer device storage medium is not limited to the foregoing several types. The system memory 1204 and the mass storage device 1207 may be collectively referred to as a memory.

According to the various embodiments of this disclosure, the computer device 1200 may further be connected, through a network such as the Internet, to a remote computer device on the network and run. That is, the computer device 1200 may be connected to a network 1211 by using a network interface unit 1212 connected to the system bus 1205, or may be connected to another type of network or a remote computer device system (not shown) by using a network interface unit 1212.

The memory also includes one or more programs, which are stored in the memory. The CPU 1201 executes all or part of the steps of the above virtual object control method or the above virtual object display methods by executing the one or more programs.

The embodiments of this disclosure further provide a computer device. The computer device includes a processor (processing circuitry) and a memory (non-transitory computer-readable storage medium). Herein, the term "processing circuitry" corresponds to one or more processors and the term "non-transitory computer-readable storage medium" corresponds to one or more memories. The memory stores a computer program. The computer program is loaded and executed by the processor to implement the virtual object control method or the virtual object display methods provided in the above various method embodiments.

This disclosure further provides a computer-readable storage medium. The storage medium stores a computer program. The computer program is loaded and executed by a processor to implement the virtual object control method or the virtual object display methods provided in the above various method embodiments.

This disclosure provides a computer program product. The computer program product includes a computer program. The computer program is stored in a computer-readable storage medium. A processor of a computer device reads the computer program from the computer-readable storage medium and executes the computer program, causing the computer device to implement the virtual object control method or the virtual object display methods provided in the above various method embodiments.

It is noted that, Information (including but not limited to object device information and object personal information), data (including but not limited to data for analysis, stored data, displayed data, and the like), and signals involved in this disclosure are authorized by an object or fully authorized by all parties, and the acquisition, use, and processing of the relevant data need to comply with relevant laws, regulations, and standards of relevant countries and regions. For example, the virtual object, virtual environment, and the like involved in this disclosure are obtained with full authorization.

The sequential numbers of the foregoing embodiments of this disclosure are merely for description purpose but do not imply the preference of the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium mentioned above may be a ROM, a magnetic disk, an optical disc, or the like.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A virtual object control method performed by at least one processor, the method comprising:

outputting for display a first virtual object in a virtual environment;

controlling the first virtual object in the displayed virtual environment through a first behavior tree, the first virtual object being a Non-Player character (NPC) in the virtual environment;

obtaining a first distance between the first virtual object and a second virtual object controlled by a player in the displayed virtual environment, the second virtual object being a closest virtual object controlled by the player to the first virtual object;

selecting, based on the first distance, a second behavior tree among plural behavior trees for controlling the first virtual object, wherein each of the plural behavior trees has a different complexity level and computational cost, and the complexity level of the selected second behavior tree decreases as the first distance increases; and controlling the first virtual object to perform actions in the displayed virtual environment based on the selected second behavior tree.

2. The method according to claim 1, wherein the selecting the second behavior tree comprises:

selecting the second behavior tree in response to a determination that the first distance falls within a distance range among at least two distance ranges corresponding to the second virtual object, the selected second behavior tree corresponding to the distance range, each distance range of the at least two distance ranges corresponds to one behavior tree among the plural behavior trees.

3. The method according to claim 2, wherein the virtual environment includes plural virtual objects controlled by different players; and the method further comprises determining a distance between the first virtual object and each of two or more of the plural virtual objects controlled by the different players to determine one of the plural virtual objects controlled by the different players as the second virtual object that is the closest virtual object controlled by the player to the first virtual object.

4. The method according to claim 1, wherein the selecting the second behavior tree comprises:

replacing the first behavior tree with the selected second behavior tree; and determining that the first virtual object is controlled through the selected second behavior tree, the selected second behavior tree corresponding to the first distance.

5. The method according to claim 1, wherein the selecting the second behavior tree comprises:

adjusting a first update cycle of the first behavior tree into a second update cycle based on the first distance, the first update cycle and the second update cycle indicating a time interval between outputting two subsequent decisions by the first behavior tree;

determining the first behavior tree using the second update cycle as the selected second behavior tree; and determining that the first virtual object is controlled through the selected second behavior tree.

6. The method according to claim 5, further comprising:

adjusting a third update cycle of a service node of the first behavior tree into a fourth update cycle;

the fourth update cycle corresponding to the first distance, the service node updating data for running the first behavior tree, and the third update cycle and the fourth update cycle indicating a time interval between two adjacent updates performed by the service node.

7. The method according to claim 1, wherein one sequence node of the selected second behavior tree is attached with m decorator nodes; and the method further comprises:

performing, in controlling the first virtual object through the selected second behavior tree, condition determination once on the m decorator nodes after target data is updated for the last time within a $k^{th}$ update cycle of the selected second behavior tree, wherein the target data is input data for running the selected second behavior tree;

the sequence node returns a success value in response to a determination that all child nodes of the sequence node return a success value;

the decorator nodes perform at least one action of determining whether or not to execute a branch where the sequence node is located, determine to interrupt the branch where the sequence node is located, and determine to interrupt a low-priority branch of the branch where the sequence node is located; and m and k are positive integers.

8. The method according to claim 7, wherein the target data comprises a blackboard value;

the m decorator nodes pay attention to a same blackboard value;

the blackboard value is updated n times in the $k^{th}$ update cycle, and n is a positive integer; and the performing the condition determination comprises:

marking a current number of updates of the blackboard value on the sequence node in response to a determination that the blackboard value is updated for an $i^{th}$ time, i being a positive integer not greater than n;

obtaining m calculation results of the m decorator nodes based on the blackboard value after the blackboard value is updated for the $n^{th}$ time, and performing the condition determination once based on the m calculation results.

9. The method according to claim 8, wherein the m decorator nodes are notified in a traversing manner when the blackboard value is updated for the $i^{th}$ time; and the marking the current number of updates of the blackboard value on the sequence node comprises:

marking the sequence node once when one of the m decorator nodes is notified, so that the sequence node is marked a total of m times during the $i^{th}$ update of the blackboard value; and the obtaining the m calculation results of the m decorator nodes comprises:

obtaining the m calculation results of the m decorator nodes based on the blackboard value after the sequence node is marked m*n times.

10. The method according to claim 1, wherein types of both the first behavior tree and the selected second behavior tree are Unreal Engine 4 (UE4) behavior trees.

11. A virtual object display method performed by at least one processor, the method comprising:

outputting for display a first virtual object and a second virtual object in a virtual environment, the first virtual object being a Non-Player character (NPC), the second virtual object being a virtual object controlled by a player;

outputting for display when a first distance between the first virtual object and the second virtual object in the virtual environment is p, the first virtual object being controlled to perform a first quantity of actions based on a first behavior tree having a first complexity level and a first computational cost; and outputting for display when the first distance is q, the first virtual object being controlled to perform a second quantity of actions based on a second behavior tree having a second complexity level and a second computational cost, wherein when p is greater than q, the first quantity is less than the second quantity and the first computational cost is less than the second computational cost; and when p is less than q, the first quantity is greater than the second quantity and the first computational cost is greater than the second computational cost.

12. A virtual object control apparatus, comprising:

processing circuitry configured to output for display a first virtual object in a virtual environment;

control the first virtual object in the displayed virtual environment through a first behavior tree, the first virtual object being a Non-Player character (NPC) in the virtual environment;

obtain a first distance between the first virtual object and a second virtual object controlled by a player in the displayed virtual environment, the second virtual object being a closest virtual object controlled by the player to the first virtual object; and select, based on the first distance, a second behavior tree among plural behavior trees for controlling the first virtual object, wherein each of the plural behavior trees has a different complexity level and computational cost, and the complexity level of the selected second behavior tree decreases as the first distance increases; and control the first virtual object to perform actions in the displayed virtual environment based on the selected second behavior tree.

13. The apparatus according to claim 12, wherein the processing circuitry is further configured to:

select the second behavior tree in response to a determination that the first distance falls within a distance range among at least two distance ranges corresponding to the second virtual object, the selected second behavior tree corresponding to the distance range, each distance range of the at least two distance ranges corresponds to one behavior tree among the plural behavior trees.

14. The apparatus according to claim 13, wherein the virtual environment includes plural virtual objects controlled by different players; and the processing circuitry is further configured to determine a distance between the first virtual object and each of two or more of the plural virtual objects controlled by the different players to determine one of the plural virtual objects controlled by the different players as the second virtual object that is the closest virtual object controlled by the player to the first virtual object.

15. The apparatus according to claim 12, wherein the processing circuitry is further configured to:

replace the first behavior tree with the selected second behavior tree; and determine that the first virtual object is controlled through the selected second behavior tree, the selected second behavior tree corresponding to the first distance.

16. The apparatus according to claim 12, wherein the processing circuitry is further configured to:

adjust a first update cycle of the first behavior tree into a second update cycle based on the first distance, the first update cycle and the second update cycle indicating a time interval between outputting two subsequent decisions by the first behavior tree;

determine the first behavior tree using the second update cycle as the selected second behavior tree; and determine that the first virtual object is controlled through the selected second behavior tree.

17. The apparatus according to claim 16, wherein the processing circuitry is further configured to:

adjust a third update cycle of a service node of the first behavior tree into a fourth update cycle;

the fourth update cycle corresponding to the first distance, the service node updating data for running the first behavior tree, and the third update cycle and the fourth update cycle indicating a time interval between two adjacent updates performed by the service node.

18. The apparatus according to claim 12, wherein one sequence node of the selected second behavior tree is attached with m decorator nodes; and the processing circuitry is further configured to:

perform, in controlling the first virtual object through the selected second behavior tree, condition determination once on the m decorator nodes after target data is updated for the last time within a $k^{th}$ update cycle of the selected second behavior tree, wherein the target data is input data for running the selected second behavior tree;

the sequence node returns a success value in response to a determination that all child nodes of the sequence node return a success value;

the decorator nodes perform at least one action of determining whether or not to execute a branch where the sequence node is located, determine to interrupt the branch where the sequence node is located, and determine to interrupt a low-priority branch of the branch where the sequence node is located; and m and k are positive integers.

19. The apparatus according to claim 18, wherein the target data comprises a blackboard value;

the m decorator nodes pay attention to a same blackboard value;

the blackboard value is updated n times in the $k^{th}$ update cycle, and n is a positive integer; and the processing circuitry is further configured to:

mark a current number of updates of the blackboard value on the sequence node in response to a determination that the blackboard value is updated for an $i^{th}$ time, i being a positive integer not greater than n;

obtain m calculation results of the m decorator nodes based on the blackboard value after the blackboard value is updated for the $n^{th}$ time, and perform the condition determination once based on the m calculation results.

20. The apparatus according to claim 19, wherein the m decorator nodes are notified in a traversing manner when the blackboard value is updated for the $i^{th}$ time; and the processing circuitry is further configured to:

mark the sequence node once when one of the m decorator nodes is notified, so that the sequence node is marked a total of m times during the $i^{th}$ update of the blackboard value; and obtain the m calculation results of the m decorator nodes based on the blackboard value after the sequence node is marked m*n times.

* * * * *